United States Patent
Yamagishi

(10) Patent No.: US 10,244,287 B2
(45) Date of Patent: *Mar. 26, 2019

(54) TRANSMISSION APPARATUS AND METHOD, RECEPTION APPARATUS AND METHOD, AND TRANSMISSION AND RECEPTION SYSTEM

(71) Applicant: Saturn Licensing LLC, New York, NY (US)

(72) Inventor: Yasuaki Yamagishi, Kanagawa (JP)

(73) Assignee: Saturn Licensing LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/677,610

(22) Filed: Aug. 15, 2017

(65) Prior Publication Data

US 2018/0070142 A1 Mar. 8, 2018

Related U.S. Application Data

(63) Continuation of application No. 14/026,551, filed on Sep. 13, 2013, now Pat. No. 9,762,968, which is a
(Continued)

(51) Int. Cl.
*H04L 29/08* (2006.01)
*H04N 21/475* (2011.01)
(Continued)

(52) U.S. Cl.
CPC ... *H04N 21/4758* (2013.01); *H04N 21/25883* (2013.01); *H04N 21/25891* (2013.01);
(Continued)

(58) Field of Classification Search
CPC .................................................... H04L 67/28
See application file for complete search history.

(56) References Cited

U.S. PATENT DOCUMENTS

| 6,459,427 B1 | 10/2002 | Mao et al. |
| 9,031,878 B2 | 5/2015 | Kltazato |

(Continued)

FOREIGN PATENT DOCUMENTS

| EP | 2 611 149 | 7/2013 |
| JP | 2002-175326 | 6/2002 |

(Continued)

OTHER PUBLICATIONS

U.S. Appl. No. 13/216,375, filed Aug. 24, 2011, 2012-0063508, Hattori, et al.
(Continued)

*Primary Examiner* — Adnan M Mirza
(74) *Attorney, Agent, or Firm* — Oblon, McClelland, Maier & Neustadt, L.L.P.

(57) ABSTRACT

A content reception apparatus, for receiving non-real-time (NRT) content, includes circuitry that receives a digital television broadcast signal including a digital television program, the NRT content, and filtering criteria related to the NRT content and outputs the digital television program for display to a user. The circuitry receives question information relating to a preference, demographic, or interest of the user and generates user answer information based on the question information received. Further, the circuitry compares the user answer information and the filtering criteria, and filters the NRT content based on the comparison.

12 Claims, 30 Drawing Sheets

Related U.S. Application Data continuation of application No. 13/071,560, filed on Mar. 25, 2011, now Pat. No. 8,892,636.

(60) Provisional application No. 61/378,211, filed on Aug. 30, 2010.

(51) Int. Cl.

| | | |
|---|---|---|
| *H04N 21/258* | (2011.01) | |
| *H04N 21/658* | (2011.01) | |
| *H04N 21/8543* | (2011.01) | |
| *H04N 21/8545* | (2011.01) | |
| H04H 60/33 | (2008.01) | |
| H04H 60/65 | (2008.01) | |
| H04H 60/72 | (2008.01) | |

(52) U.S. Cl.
CPC ..... *H04N 21/6582* (2013.01); *H04N 21/8543* (2013.01); *H04N 21/8545* (2013.01); *H04H 60/33* (2013.01); *H04H 60/65* (2013.01); *H04H 60/72* (2013.01); *H04L 67/28* (2013.01)

(56) References Cited

U.S. PATENT DOCUMENTS

| | | |
|---|---|---|
| 2003/0004884 A1 | 1/2003 | Kitazato |
| 2003/0101449 A1 | 5/2003 | Bentolila et al. |
| 2003/0144899 A1 | 7/2003 | Kokubo |
| 2004/0172650 A1 | 9/2004 | Hawkins et al. |
| 2004/0261127 A1 | 12/2004 | Freeman et al. |
| 2007/0156384 A1 | 7/2007 | Plunkett |
| 2009/0018915 A1 | 1/2009 | Fisse |
| 2009/0210901 A1 | 8/2009 | Hawkins et al. |
| 2009/0313663 A1 | 12/2009 | Kitazato et al. |

FOREIGN PATENT DOCUMENTS

| | | |
|---|---|---|
| JP | 2002-175363 A | 6/2002 |
| JP | 2003-9119 | 10/2003 |
| JP | 2005-296678 A | 9/2005 |
| JP | 2008-236794 | 10/2008 |
| JP | 2008-236794 A | 10/2008 |
| JP | 2003-176363 A | 8/2009 |
| JP | 2009-178363 | 8/2009 |
| JP | 2010-021988 | 1/2010 |

OTHER PUBLICATIONS

U.S. Appl. No. 12/980,917, filed Dec. 29, 2010, 2012-0054816, Dewa.
U.S. Appl. No. 13/107,604, filed May 13, 2011, 2012-0072965, Dewa.
U.S. Appl. No. 13/238,080, filed Sep. 21, 2011, 2012-0082266, Kitazato, et al.
U.S. Appl. No. 13/212,972, filed Aug. 18, 2011, 2012-0050620, Kitazato.
U.S. Appl. No. 13/220,231, filed Aug. 29, 2011, 2012-0060197, Kitahara, et al.
U.S. Appl. No. 13/081,566, filed Apr. 7, 2011, 2012-0054784, Kitazato, et al.
U.S. Appl. No. 13/038,939, filed Mar. 2, 2011, 2011-0302599, Eyer.
U.S. Appl. No. 12/985,241, filed Jan. 5, 2011, 2011-0243536, Eyer.
U.S. Appl. No. 13/043,170, filed Mar. 8, 2011, 2012-0047531, Eyer.
U.S. Appl. No. 13/041,743, filed Mar. 7, 2011, 2012-0044418, Eyer.
U.S. Appl. No. 13/039,005, filed Mar. 2, 2011, 2011-0299827, Eyer.
U.S. Appl. No. 13/071,560, filed Mar. 25, 2011, 2012-0054268, Yamagishi.
U.S. Appl. No. 13/071,559, filed Mar. 25, 2011, 2012-0054267, Yamagishi, et al.
U.S. Appl. No. 13/071,238, filed Mar. 24, 2011, 2012-0054783, Yamagishi.
U.S. Appl. No. 13/075,440, filed Mar. 30, 2011, 2012-0054214 Yamagishi, et al.
U.S. Appl. No. 12/881,361, filed Sep. 14, 2010, 2011-0075990, Eyer.
U.S. Appl. No. 13/046,579, filed Mar. 11, 2011, 2011-0247028, Eyer.
U.S. Appl. No. 13/206,627, filed Aug. 10, 2011, 2012-0084802, Kitazato.
U.S. Appl. No. 13/238,065, filed Sep. 21, 2011, 2012-0081607, Kitazato.
U.S. Appl. No. 12/942,835, filed Nov. 9, 2010, 2011-0246488, Eyer.
U.S. Appl. No. 13/009,720, filed Jan. 19, 2011, 2012-0185888, Eyer, et al.
U.S. Appl. No. 13/304,126, filed Nov. 23, 2011, 2012-0275764, Eyer.
U.S. Appl. No. 13/080,866, filed Apr. 6, 2011, 2012-0054235, Kitazato, et al.
U.S. Appl. No. 13/071,551, filed Mar. 25, 2011, 2012-0050619, Kitazato, et al.
U.S. Appl. No. 13/239,871, filed Sep. 22, 2011, 2012-0084824, Kitazato.
U.S. Appl. No. 13/238,138, filed Sep. 21, 2011, 2012-0084829, Kitazato.
U.S. Appl. No. 13/238,277, filed Sep. 21, 2011, 2012-0081508. Kitazato.
U.S. Appl. No. 13/238,264, filed Sep. 21, 2011, 2012-0082440, Kitazato.
U.S. Appl. No. 12/798,118, filed Mar. 30, 2010, 2011-0088075, Eyer.
U.S. Appl. No. 13/038,984, filed Mar. 2, 2011, 2011-0298981, Eyer.
U.S. Appl. No. 13/038,967, filed Mar. 2, 2011, 2011-0302611, Eyer.
U.S. Appl. No. 12/959,529, filed Dec. 3, 2010, 2011-0307920, Blanchard, et al.
U.S. Appl. No. 13/422,203, filed Mar. 16, 2012, 2012-0253826, Kitazato, et al.
U.S. Appl. No. 13/452,376, filed Apr. 20, 2012, 2012-0274848, Kitahara, et al.
U.S. Appl. No. 13/562,946, filed Jul. 31, 2012, 2013-0055313, Eyer.
U.S. Appl. No. 13/559,166, filed Jul. 26, 2012, 2013-0036440, Eyer.
U.S. Appl. No. 13/490,216, filed Jun. 6, 2012, 2013-0024894, Eyer.
U.S. Appl. No. 13/554,688, filed Jul. 20, 2012, 2013-0031569, Eyer.
U.S. Appl. No. 13/559,188, filed Jul. 26, 2012, 2013-0198768, Kitazato.
U.S. Appl. No. 13/527,435, filed Jun. 19, 2012, 2013-0024897, Eyer.
U.S. Appl. No. 13/587,975, filed Aug. 17, 2012, Kitazato.
U.S. Appl. No. 13/593,554, filed Aug. 24, 2012, Kitazato et al.
U.S. Appl. No. 13/648,753, filed Oct. 10, 2012, 2013-0103716, Yamagishi.
U.S. Appl. No. 13/679,624, filed Nov. 16, 2012, 2013-0145414, Yamagishi.
U.S. Appl. No. 13/708,313, filed Dec. 7, 2012, 2013-0167171, Kitazato et al.
U.S. Appl. No. 13/741,863, filed Jan. 15, 2013, 2013-0191860, Kitazato et al.
U.S. Appl. No. 13/753,591, filed Jan. 30, 2013, 2013-0201399, Kitazato et al.
U.S. Appl. No. 13/777,429, filed Feb. 26, 2013, Kitazato et al.
U.S. Appl. No. 13/777,693, filed Feb. 26, 2013, Kitazato et al.
U.S. Appl. No. 13/777,734, filed Feb. 26, 2013, Kitazato et al.
U.S. Appl. No. 13/782,694, filed Mar. 1, 2013, Eyer.
U.S. Appl. No. 13/782,730, filed Mar. 1, 2013, Eyer.
U.S. Appl. No. 13/800,818, filed Mar. 13, 2013, Eyer.
U.S. Appl. No. 13/800,734, filed Mar. 13, 2013, Eyer.
U.S. Appl. No. 13/841,343, filed Mar. 15, 2013, 2013-0205327, Eyer.
U.S. Appl. No. 13/846,282, filed Mar. 18, 2013, Dewa et al.
U.S. Appl. No. 13/846,247, filed Mar. 18, 2013, Kitazato et al.
U.S. Appl. No. 13/888,865, filed May 7, 2013, Kitahara et al.
U.S. Appl. No. 13/894,779, filed May 15, 2013, Yamagishi.
U.S. Appl. No. 13/905,721, filed May 30, 2013, Kitahara et al.
U.S. Appl. No. 13/915,664, filed Jun. 12, 2013, Eyer.
U.S. Appl. No. 13/930,814, filed Jun. 28, 2013, Fay.

(56) References Cited

OTHER PUBLICATIONS

U.S. Appl. No. 13/930,880, filed Jun. 28, 2013, Fay et al.
U.S. Appl. No. 13/924,907, filed Jun. 24, 2013, Eyer.
U.S. Appl. No. 13/927,667, filed Jun. 26, 2013, Yamagishi.
U.S. Appl. No. 13/934,581, filed Jul. 3, 2013, Eyer.
U.S. Appl. No. 13/934,549, filed Jul. 3, 2013, Fay et al.
U.S. Appl. No. 13/934,615, filed Jul. 3, 2013, Eyer.
U.S. Appl. No. 13/934,924, filed Jul. 3, 2013, Yamagishi.
U.S. Appl. No. 13/934,473, filed Jul. 3, 2013, Yamagishi.
U.S. Appl. No. 13/955,130, filed Jul. 31, 2013, Fay.
U.S. Appl. No. 13/963,138, filed Aug. 9, 2013, Fay et al.
U.S. Appl. No. 13/963,111, filed Aug. 9, 2013, Fay et al.
U.S. Appl. No. 13/968,035, filed Aug. 15, 2013, Eyer et al.
U.S. Appl. No. 14/025,310, filed Sep. 12, 2013, Dewa.
Office Action dated Aug. 22, 2017 in Korean Patent Application No. 10-2013-7004130.
Office Action dated Sep. 10, 2015 in Japanese Patent Application No. 2012-531799.
Office Action dated Mar. 1, 2016 in Japanese Patent Application No. 2012-531799 (with English translation).
Extended European Search Report dated Mar. 24, 2014 in Patent Application No. 11821585.4.
International Search Report dated Sep. 27, 2011, in PCT/JP2011/068837 with English translation.

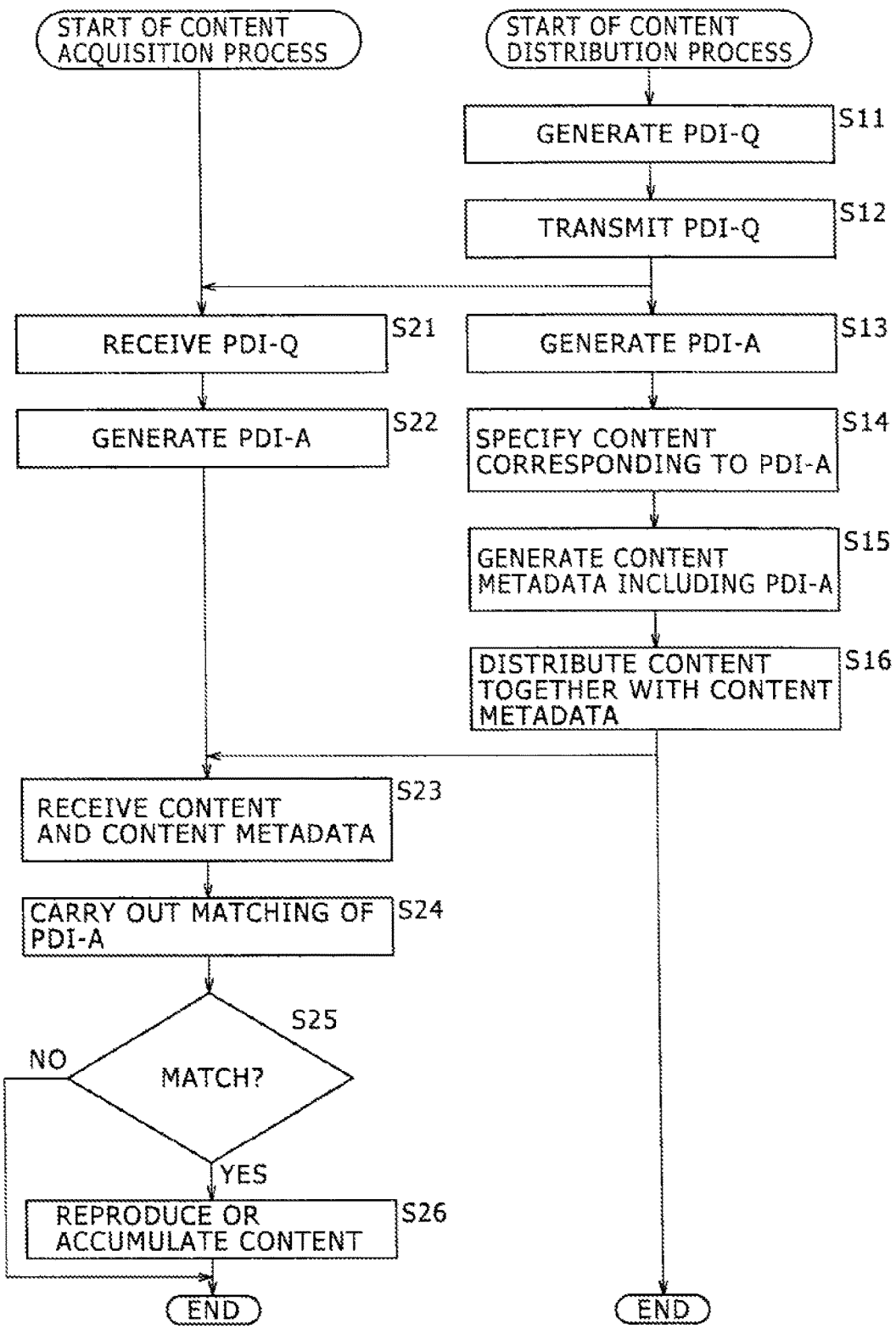

FIG.6

```
 1: <xs:schema xmlns:xs="http://www.w3.org/2001/XMLSchema" elementFormDefault="qualified"
    attributeFormDefault="unqualified">
 2:     <xs:element name="PDItable" type="PDItableType"/>
 3:     <xs:complexType name="PDItableType">
 4:         <xs:choice maxOccurs="unbounded">
 5:             <xs:element name="QIA" type="IntegerAnswerType"/>
 6:             <xs:element name="QBA" type="BooleanAnswerType"/>
 7:             <xs:element name="QSA" type="SelectionAnswerType"/>
 8:             <xs:element name="QTA" type="TextAnswerType"/>
 9:             <xs:element name="QAA" type="AnyAnswerType"/>
10:         </xs:choice>
11:         <xs:attribute name="transactional" type="xs:boolean" use="optional"/>
12:     </xs:complexType>
13:     <xs:complexType name="IntegerAnswerType">
14:         <xs:sequence>
15:             <xs:element name="id" type="xs:anyURI"/>
16:             <xs:element name="q" type="xs:string" minOccurs="0"/>
17:             <xs:element name="a" type="xs:integer" minOccurs="0"/>
18:         </xs:sequence>
19:         <xs:attribute name="minInclusive" type="xs:integer" use="optional"/>
20:         <xs:attribute name="maxInclusive" type="xs:integer" use="optional"/>
21:     </xs:complexType>
22:     <xs:complexType name="BooleanAnswerType">
23:         <xs:sequence>
24:             <xs:element name="id" type="xs:anyURI"/>
25:             <xs:element name="q" type="xs:string" minOccurs="0"/>
26:             <xs:element name="a" type="xs:boolean" minOccurs="0"/>
27:         </xs:sequence>
28:     </xs:complexType>
29:     <xs:complexType name="SelectionAnswerType">
30:         <xs:sequence>
31:             <xs:element name="id" type="xs:anyURI"/>
32:             <xs:element name="q" type="xs:string" minOccurs="0"/>
33:             <xs:element name="a" type="xs:string" minOccurs="0" maxOccurs="unbounded"/>
34:         </xs:sequence>
35:         <xs:attribute name="minChoice" type="xs:integer" use="optional"/>
36:         <xs:attribute name="maxChoice" type="xs:integer" use="optional"/>
37:     </xs:complexType>
38:     <xs:complexType name="TextAnswerType">
39:         <xs:sequence>
40:             <xs:element name="id" type="xs:anyURI"/>
41:             <xs:element name="q" type="xs:string" minOccurs="0"/>
42:             <xs:element name="a" type="xs:string" minOccurs="0"/>
43:         </xs:sequence>
44:     </xs:complexType>
45: </xs:schema>
```

FIG. 7

```
 1: <PDItable transactional="true" >
 2:   <QBA>
 3:     <id>Common:111</id>
 4:     <q>Are you currently employed?</q>
 5:   </QBA>
 6:   <QIA minInclusive="10" maxInclusive="100">
 7:     <id>Common:222</id>
 8:     <q>What is the age of the oldest member of the household who watches television?</q>
 9:   </QIA>
10:   <QSA minChoice="1" maxChoice="3">
11:     <id>ProviderA:123</id>
12:     <q>In which of the following sports are you most interested? (Multiple selection allowed)</q>
13:     <a>Baseball</a>
14:     <a>Basketball</a>
15:     <a>Soccer</a>
16:     <a>Hockey</a>
17:   </QSA>
18:   <QSA maxChoice="1">
19:     <id>ProviderA:ProgramX:123</id>
20:     <q>Do you enjoy camping and outdoor recreation?(Only one selection)</q>
21:     <a>Never</a>
22:     <a>Occasionally</a>
23:     <a>Frequently</a>
24:   </QSA>
25:   <QTA>
26:     <id>ProviderA:321</id>
27:     <q> Who's products are you most interested in recently? </q>
28:   </QTA>
29: </PDItable>
```

FIG. 8

QUESTION: Are you currently employed? — 61

Yes — 62-1

No — 62-2

CHOOSE ONE

FIG. 9

QUESTION: What is the age of the oldest member of the household who watches television? ~71

ENTER AGE ~72

FIG. 10

QUESTION: In which of the following sports are you most interested? (Multiple selection allowed) ~81

| Baseball | ~82-1 |
| Basketball | ~82-2 |
| Soccer | ~82-3 |
| Hockey | ~82-4 |

CHOOSE ONE TO THREE ANSWERS

FIG. 11

QUESTION: Do you enjoy camping and outdoor recreation? (Only one selection) —91

92-1 — Never
92-2 — Occasionally
92-3 — Frequently

CHOOSE ONE

FIG.13

```
1 : <PDItable >
2 :   <QBA>
3 :     <id>Common:111</id>
4 :     <a>true</a>
5 :   </QBA>
6 :   <QIA>
7 :     <id>Common:222</id>
8 :     <a>34</a>
9 :   </QIA>
10 :  <QSA>
11 :    <id>ProviderA:123</id>
12 :    <a>Baseball</a>
13 :    <a>Soccer</a>
14 :    <a>Hockey</a>
15 :  </QSA>
16 :  <QSA>
17 :    <id>ProviderA:ProgramX:123</id>
18 :    <a>Occasionally</a>
19 :  </QSA>
20 :  <QTA>
21 :    <id>ProviderA:321</id>
22 :    <a>Sony</a>
23 :  </QTA>
24 : </PDItable>
```

FIG. 14

```
 1:  <PDItable>
 2:    <QBA>
 3:      <id>Common:111</id>
 4:      <a>false</a>
 5:    </QBA>
 6:    <QSA>
 7:      <id>ProviderA:123</id>
 8:      <a>Baseball</a>
 9:    </QSA>
10:    <QSA>
11:      <id>ProviderA:ProgramX:123</id>
12:      <a>Never</a>
13:    </QSA>
14:  </PDItable>
```

FIG.15

```
 1: <PDItable>
 2:   <QSA>
 3:     <id>ProviderA:123</id>
 4:     <a>Basketball</a>
 5:   </QSA>
 6:   <QSA>
 7:     <id>ProviderA:ProgramX:123</id>
 8:     <a>Never</a>
 9:   </QSA>
10: </PDItable>
```

FIG.23

```
Service
    id
    version
    validFrom
    validTo
    globalServiceID
    weight
    baseCID
    ServiceType
    Name
    Description
    AudioLanguage
        languageSDPTag
    TextLanguage
        languageSDPTag
    ParentalRating
        ratingSystem
        ratingValueName
    Genre
    Extesion
        url
        Description
    PreviewDataReference
        idRef
        usage
    PrivateExt
        PDI-A
```

FIG.24

```
Schedule
    id
    version
    defaultSchedule
    onDemand
    validFrom
    validTo
    ServiceReference
        idRef
    ContentReference
        idRef
        contentLocation
        PresentationWindow
            startTime
            endTime
    PrivateExt
        PDI-A
```

FIG.25

```
Content
    id
    version
    validFrom
    validTo
    globalContentID
    baseCID
    ServiceReference
        idRef
        weight
    Name
    Description
    StartTime
    EndTime
    AudioLanguage
        languageSDPTag
    TextLanguage
        languageSDPTag
    Length
    ParentalRating
        ratingSystem
        ratingValueName
    Genre
    Extension
        url
        Description
    PrevewDataReference
        idRef
        usage
    PrivateExt
        PDI-A
```

FIG. 30

| Syntax | No. of bits | Format |
|---|---|---|
| PDI_descriptor() { | | |
| descriptor_tag | 8 | 0x(TBD) |
| descriptor_length | 8 | uimsbf |
| length | 8 | uimsbf |
| PDI_Q or PDI_A or PDI_A_Query | var | - |
| } | | | int
TRANSMISSION APPARATUS AND METHOD, RECEPTION APPARATUS AND METHOD, AND TRANSMISSION AND RECEPTION SYSTEM

CROSS-REFERENCE TO RELATED APPLICATIONS

The present application is a continuation of U.S. application Ser. No. 14/026,551, filed Sep. 13, 2013, which is a continuation of U.S. application Ser. No. 13/071,560, filed Mar. 25, 2011, now patented as U.S. Pat. No. 8,892,636, which is a non-provisional application of and claims the benefit of priority from U.S. Application No. 61/378,211, filed Aug. 30, 2010, the entire contents of which are incorporated herein by reference.

BACKGROUND OF THE INVENTION

1. Field of the Invention

This invention relates to a transmission apparatus and method, a reception apparatus and method, and a transmission and reception system, and more particularly to a transmission apparatus and method, a reception apparatus and method, and a transmission and reception system by which a content can be acquired in response to metadata.

2. Description of the Related Art

In recent years, together with digitalization of television broadcasting, the amount of information which can be broadcast at a time has increased dramatically, and various data are broadcast simultaneously together with a television program or content to be viewed on the real time basis.

Further, as a communication path for a content, a content download service which selectively uses the television broadcasting described above and the Internet which allows high speed downloading of data has been proposed and is disclosed, for example, in Japanese Patent Laid-Open No. 2010-21988.

Incidentally, in general content download services, a filtering attribute also called filtering index, filtering metadata or the like set by a server on the provider side which provides or distributes contents such as the content provider side or the service provider side is added as metadata to a content. Consequently, a client which receives or acquires the content can carry out filtering of the content.

The filtering attribute is set as a value of an element of metadata selected from within a metadata set prescribed by a standardization organization such as ATSC (Advanced Television Standard Committee) or ARIB (Association of Radio Industries and Businesses).

In particular, a content to which filtering attributes that "viewing target" is selected as an element of metadata and that "years of life between ten and nineteen" is set as a value regarding the element of the metadata are applied is provided to clients which carry out filtering so as to acquire a "content for a viewer whose "viewing target is viewers whose years of life are between ten and nineteen."

SUMMARY OF THE INVENTION

However, it is not available to apply metadata or a filtering attribute which is not included in a metadata set prescribed by a standardization organization to a content.

For example, even if the provider side wants to distribute a content whose "watching target is viewers of years of life between ten and nineteen" to viewers who "are interested in job-hunting," if a metadata set prescribed by a standardization organization does not include "whether or not a viewer is interested in job-hunting" as an element of metadata, then the provider side cannot apply a filtering attribute that "interested in job-hunting" is set as an element of metadata to the content.

Accordingly, the provider side cannot distribute a content to which a matter which satisfies current needs such as, for example, to take a trend into consideration and in which a viewer is interested is applied as metadata.

Further, in such a case as described above, the client side cannot carry out filtering so that a content which satisfies the needs at the time is obtained.

Therefore, it is desirable to provide a transmission apparatus and method, a reception apparatus and method, and a transmission and reception system by which a content which satisfies needs at the time can be acquired.

According to a first embodiment of the present invention, there is provided a transmission apparatus for distributing a content to a client, including question generation means for generating question information representative of a question regarding liking of a user of the client, and transmission means for transmitting the question information and provider side answer information in the form of a bit string representative of an answer set by a provider which provides the content to the question regarding the liking of the user to the client.

The transmission apparatus may further include metadata generation means for generating metadata including the provider side answer information as metadata of the content corresponding to the answer set by the provider, the transmission means transmitting the metadata to the client.

The transmission apparatus further includes query generation means for generating a query representative of a combination of answers set by the provider, the transmission means transmitting the query to the client.

The provider side answer information can be distinguished into common answer information representative of an answer to a question which does not depend upon the provider and unique answer information representative of an answer to a question which is unique to the provider.

According to the first embodiment of the present invention, there is provided also a transmission method for a transmission apparatus for distributing a content to a client, including the steps of generating question information representative of a question regarding liking of a user of the client, and transmitting the question information and provider side answer information representative of an answer set by a provider which provides the content to the question regarding the liking of the user to the client.

In the transmission apparatus and the transmission method, question information representative of a question regarding liking of a user of the client is generated. Then, the generated question information and provider side answer information representative of an answer set by a provider which provides the content to the question regarding the liking of the user are transmitted to the client.

According to a second embodiment of the present invention, there is provided a reception apparatus for acquiring a content distributed from a server, including answer generation means for generating, in response to question information representative of a question regarding liking of a user and transmitted from the server to the reception apparatus, user side answer information representative of an answer of the user to the question, and matching means for carrying out matching between the user side answer information and provider side answer information representative of an answer set by a provider which provides the content to the question and transmitted from the server to the reception apparatus to determine acquisition of the content distributed from the server.

The matching means may carry out the matching to determine acquisition of the content corresponding to metadata including the provider side answer information.

The matching means can carry out the matching based on the user side answer information and a query transmitted from the server and representative of a combination of answers set by the provider to determine acquisition of the content distributed from the server.

In the reception apparatus, the answer generation means may generate a query representative of a combination of answers of the user to the question regarding the liking of the user, and the matching means can carry out the matching based on the query and the provide side answer information transmitted from the server to determine acquisition of the content distributed from the server.

The user side answer information and the provider side information can be distinguished into common answer information representative of an answer to a question which does not depend upon the provider and unique answer information representative of an answer to a question which is unique to the provider.

According to the second embodiment of the present invention, there is provided also a reception method for a reception apparatus for acquiring a content distributed from a server, including the steps of generating, in response to question information representative of a question regarding liking of a user and transmitted from the server to the reception apparatus, user side answer information representative of an answer of the user to the question, and carrying out matching between the user side answer information and provider side answer information representative of an answer set by a provider which provides the content to the question and transmitted from the server to the reception apparatus to determine acquisition of the content distributed from the server.

In the reception apparatus and the reception method, in response to question information representative of a question regarding liking of a user and transmitted from the server to the reception apparatus, user side answer information representative of an answer of the user to the question is generated. Then, matching between the generated user side answer information and provider side answer information representative of an answer set by a provider which provides the content to the question and transmitted from the server is carried out to determine acquisition of the content distributed from the server.

According to a third embodiment of the present invention, there is provided a transmission and reception system, including a transmission apparatus adapted to distribute a content, and a reception apparatus adapted to acquire the content distributed from the transmission apparatus, the transmission apparatus including question generation means for generating question information representative of a question regarding liking of a user of the reception apparatus, and transmission means for transmitting the question information and provider side answer information representative of an answer set by a provider which provides the content to the question regarding the liking of the user to the reception apparatus, the reception apparatus including answer generation means for generating user side answer information representative of an answer of the user to the question in response to the question information transmitted from the transmission apparatus, and matching means for carrying out matching between the user side answer information and the provider side answer information transmitted from the transmission apparatus to determine acquisition of the content distributed from the transmission apparatus.

In the transmission and reception system, question information representative of a question regarding liking of a user of the reception apparatus is generated. Then, the question information and provider side answer information representative of an answer set by a provider which provides the content to the question regarding the liking of the user is transmitted to the reception apparatus. User side answer information representative of an answer of the user to the question is generated in response to the question information transmitted to the reception apparatus from the transmission apparatus. Then, matching between the generated user side answer information and the provider side answer information transmitted from the transmission apparatus is carried out to determine acquisition of the content distributed from the transmission apparatus.

With the transmission apparatus and method, reception apparatus and method, and transmission and reception system, it becomes possible to acquire a content which satisfies needs at the time.

BRIEF DESCRIPTION OF THE DRAWINGS

FIG. 5 is a flow chart illustrating content transmission and reception processes;

FIG. 6 is a view illustrating an example of syntax of the XML schema;

FIG. 7 is a view illustrating an example of a PDI-Q;

FIGS. 8 to 12 are schematic views showing different examples of screen image display in interaction with a user;

FIG. 13 is a view illustrating an example of a PDI-A;

FIGS. 14 and 15 are views illustrating different examples of a provider side PDI-A;

FIG. 23 is a view illustrating a configuration of a Service fragment;

FIG. 24 is a view illustrating a configuration of a Schedule fragment;

FIG. 25 is a view illustrating a configuration of a Content fragment;

FIG. 30 is a view illustrating an example of syntax of a PDI descriptor.

DETAILED DESCRIPTION OF THE PREFERRED EMBODIMENTS

In the following, preferred embodiments of the present invention are described with reference to the accompanying drawings. It is to be noted that the description is carried out in the following order.

Example of the Configuration of the Broadcasting System

Figure 1:
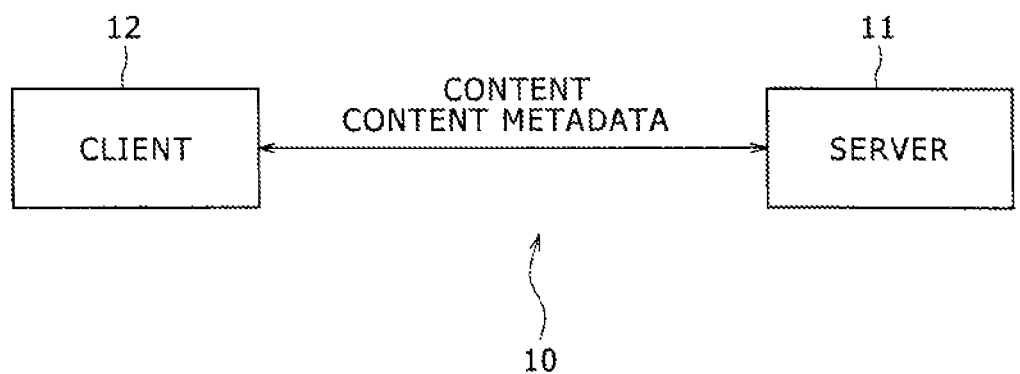
FIG. 1 is a block diagram showing an example of a configuration of a broadcasting system according to a first embodiment of the present invention.

FIG. 1 shows an example of a configuration of a broadcasting system according to an embodiment of the present invention.

The broadcasting system 10 of FIG. 1 is configured from a server 11 provided on the provider side such as a broadcasting company which broadcasts or provides a digital television program (hereinafter referred to suitably as content) and a client terminal (hereinafter referred to simply as client) 12 installed in a home of a user who enjoys broadcast contents. It is to be noted that, while the client 12 is installed in a plurality of user homes, the client 12 can be configured also as a portable terminal apparatus such as a portable telephone set or a PDA (Personal Digital Assistant).

In the broadcasting system 10, the server 11 transmits a content together with content metadata regarding the content as a signal of a digital broadcasting wave to the client 12. The client 12 carries out filtering of the content based on the content metadata transmitted thereto together with the content so that only the content desired by the user is reproduced or accumulated. It is to be noted that the content metadata may not be transmitted together with the content but may be transmitted before the content is transmitted.

Example of the Hardware Configuration of the Server

Figure 2:
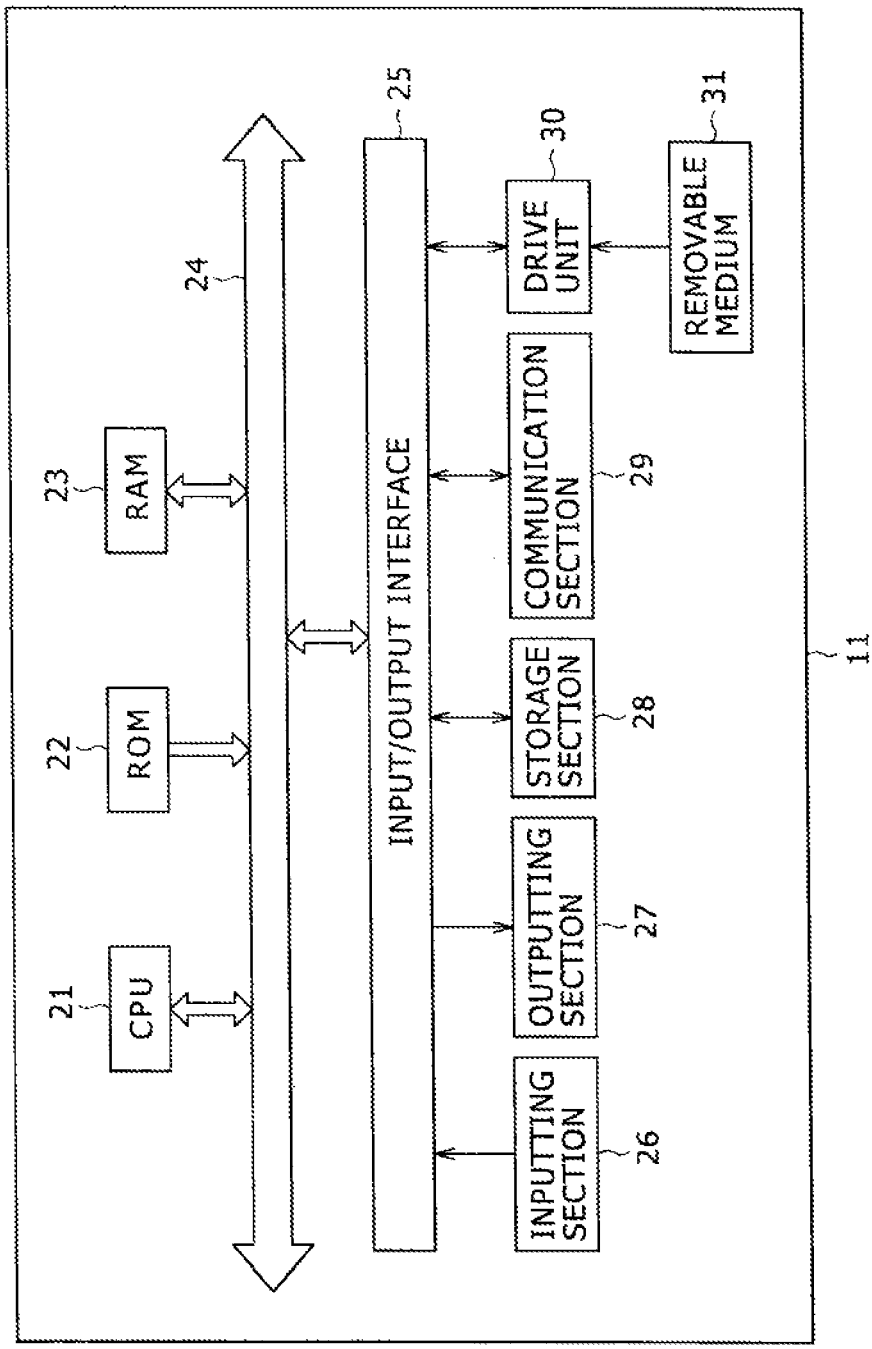
FIG. 2 is a block diagram showing an example of a hardware configuration of a server.

FIG. 2 shows an example of a hardware configuration of the server 11. Referring to FIG. 2, the server 11 is configured, for example, using a computer as a base.

A CPU (Central Processing Unit) 21 executes various processes in accordance with a program stored in a ROM (Read Only Memory) 22 or a program loaded from a storage section 28 into a RAM (Random Access Memory) 23. Data necessary for executing various processes by the CPU 21 and so forth are suitably stored into the RAM 23.

The CPU 21, ROM 22 and RAM 23 are connected to each other through a bus 24. Also an input/output interface 25 is connected to the bus 24.

To the input/output interface 25, an inputting section 26 configured from a keyboard, a mouse and so forth, an outputting section 27 configured from a display unit such as a CRT (Cathode Ray Tube), an LCD (Liquid Crystal Display) unit or the like, a speaker and so forth, the storage section 28 configured from a hard disk and so forth and a communication section 29 configured from a modem, a terminal adapter and so forth are connected. The communication section 29 communicates with an external apparatus through a network not shown. Further, a program may be acquired through the communication section 29 and stored into the storage section 28.

Further, a drive unit 30 is connected to the input/output interface 25 as occasion demands and a removable medium 31 such as a magnetic disk, an optical disk, a magneto-optical disk or a semiconductor memory is suitably loaded into to the input/output interface 25. A computer program read out from such a removable medium as just described is installed into the storage section 28 as occasion demands.

It is to be noted that, though not shown, the hardware of the client 12 is configured similarly to the server 11 as shown in FIG. 2.

Example of the Functional Configuration of the Server

Next, an example of a functional configuration of the server 11 is described with reference to FIG. 3.

The server 11 is configured from a PDI-Q generator 41, a transmission section 42, a PDI-A generator 43, a metadata distributor 44, a content accumulation section 45 and a content distributor 46.

The PDI-Q generator 41 generates a PDI-Q (Preference Demographic and Interest-Question) which is information representative of questions regarding the liking of the user or viewer of the client 12. Then, the PDI-Q generator 41 transmits the generated PDI-Q to the client 12 through the transmission section 42 and supplies the PDI-Q to the PDI-A generator 43.

The transmission section 42 transmits various data supplied thereto from the PDI-Q generator 41, metadata distributor 44 and content distributor 46 to the client 12.

The PDI-A generator 43 generates, based on the PDI-Q from the PDI-Q generator 41, a PDI-A (Preference Demographic and Interest-Answer) which is information representative of an answer set on the provider side to the questions regarding the liking of the user of the client 12 described above and corresponds to the PDI-Q. The PDI-A generator 43 supplies the generated PDI-A to the metadata distributor 44.

The metadata distributor 44 specifies or refers to a content corresponding to the answer set on the provider side from among contents accumulated in the content accumulation section 45 based on the PDI-A from the PDI-A generator 43. The metadata distributor 44 generates content metadata including the PDI-A as content metadata of the specified content and transmits the generated data to the client 12 through the transmission section 42.

The content accumulation section 45 accumulates various contents to be distributed to the client 12.

The content distributor 46 acquires the content specified by the metadata distributor 44 from among the contents accumulated in the content accumulation section 45 and transmits the acquired content to the client 12 through the transmission section 42.

Example of the Functional Configuration of the Client

Next, an example of a functional configuration of the client 12 is described with reference to FIG. 4.

The client 12 is configured from a reception section 51, a PDI-A generator 52, a PDI-A storage section 53, a content filter 54, a content reproduction section 55 and a content accumulation section 56.

The reception section 51 receives various data transmitted from the server 11 and supplies the received data to the PDI-A generator 52 or the content filter 54.

The PDI-A generator 52 generates, based on the PDI-Q transmitted from the server 11, a PDI-A which indicates answers of the user to questions regarding the liking of the user of the client 12 and corresponds to the PDI-Q to supply to the PDI-A storage section 53.

The PDI-A storage section 53 stores the PDI-A from the PDI-A generator 52. The PDI-A stored in the PDI-A storage section 53 is suitably read out to the content filter 54.

The content filter 54 reads out the PDI-A from the PDI-A storage section 53 and carries out filtering of the content based on the read out PDI-A and a PDI-A included in content metadata of the content received from the server 11. The content filter 54 supplies the filtered content to the content reproduction section 55 or the content accumulation section 56 in response to a result of the filtering.

The content reproduction section 55 reproduces the content from the content filter 54. Further, the content reproduction section 55 acquires the content from the content accumulation section 56 and reproduces the acquired content.

The content accumulation section 56 accumulates or records the content from the content filter 54.

Example of the Transmission and Reception Processes of a Content

Next, transmission and reception processes of a content in the broadcasting system 10 are described with reference to a flow chart of FIG. 5. In the content transmission and reception processes of the broadcasting system 10, a content is distributed by executing a content distribution process by the server 11 and is acquired by executing a content acquisition process by the client 12.

On the case where, on the provider side such as a broadcasting company, for example, a sponsor of a content to be broadcast or distributed or the broadcasting company itself requests distribution of a content for a viewer having a specific liking or a specific attribute, the PDI-Q generator 41 of the server 11 generates, at step S11, a PDI-Q for inquiring about what liking or attribute the user has to the viewer, that is, to the user of the client 12, in response to operation of the staff on the provider side.

Example of the Syntax of the XML Schema

Here, an example of the syntax of the XML (Extensible Markup Language) schema for configuring a PDI-Q and a PDI-A is described with reference to FIG. 6.

In FIG. 6, the first row indicates a declaration or a definition for identifying the PDI-Q, and the second row indicates a name of the entire questions defined as the PDI-Q and a declaration of the type.

The third to twelfth rows indicate a name and a declaration of the type regarding the individual questions declared in the second row. In particular, the type "IntegerAnswerType" of a question defined by the name "QIA" in the fifth row indicates that the question requests an integer value type answer, and the type "BooleanAnswerType" of the question defined by the name "QBA" in the sixth row indicates that the question requests a logical value type answer. Further, the type "SelectionAnswerType" of the question defined by the name "QSA" in the seventh row indicates that the question requests an answer selection type answer, and the type "TextAnswerType" of the question defined by the name "QTA" in the eighth row indicates that the question requests a character column type answer. Further, the type "AnyAnswerType" of the question defined by the name "QAA" in the ninth row indicates that the question does not have the type of an answer thereto.

The thirteenth to 44th rows indicate declarations of elements of the questions defined by the names "QIA," "QBA," "QSA" and "QTA" from among the questions declared as described above. Particularly, id elements indicated in the 15th, 24th, 31st and 40th rows indicate IDs (Identifiers) for identifying items of the questions, and are defined as given below as a first format:

"common:[category:]question-ID"

In the first format, the term "common" indicates that the question identified by the id element is a question commonly defined independently of the provider, and the term "category" indicates a category of the question and the term "question-ID" indicates an identifier of the question. It is to be noted that the term "category" may be represented, as occasion demands, in a hierarchical nest structure like:

"common:[category1:category2:category3: . . . ]question-ID"

Further, the id element is defined as given below as a second format:

"providerName:[category:]question-ID"

In the second format, the term "providerName" indicates a name of the provider by which the question identified by the id element is set. It is to be noted that the term "category" and the term "question-ID" are similar to those in the first format.

In this manner, the questions defined as the PDI-Q are distinguished, depending upon the id element, into those questions independent of the provider which provides contents and common to providers and those questions defined uniquely by the provider which provides the content.

A question independent of the provider which provide a content and an answer to the question are hereinafter referred to suitably as provider common filtering parameter, and a question defined uniquely by the provider which provides a content and an answer to the question are hereinafter referred to suitably as provider unique filtering parameter.

As described above, since the provider common filtering parameter is defined commonly by providers without depending upon individual providers, generally the provider common filtering parameter is provided by a vendor, that is, by a maker or the like, of the client 12. Accordingly, although the PDI-Q generator 41 in the server 11 can be made so as to be provided by the provider side, it may otherwise be made so as to be provided by the vender of the client 12.

It is to be noted that the syntax which configures the PDI-Q and the PDI-A is not limited to that of the example illustrated in FIG. 6.

Example of the PDI-Q

Next, an example of the PDI-Q configured based on the syntax of FIG. 6 is described with reference to FIG. 7.

In FIG. 7, the term "transactional" in the first row is a value which indicates whether or not a recording/updating process is to be rolled back. In particular, when the questions, that is, the question group, defined by the PDI-Q are updated in the client 12 to which the questions are transmitted, all of the substance of the items of the PDI-Q may not be recorded/updated because of some accident such as disk writing error or interruption of a processing by increase of the processing load midway of processing for recording/updating the substance of the items of the PDI-Q into a storage region not shown of the client 12. If all of the substance of the items of the PDI-Q is not recorded/updated, then the recording/updating process may be invalidated, that is, a rollback process may be carried out, going back to a state just before the recording/updating of the substance of the items of the PDI-Q. Thus, whether such rollback process should be carried out is represented by "transactional." In the case where "transactional" is "true," the PDI-Q is rolled back.

The second to fifth rows define a question for requesting a logic value type answer, and <id>Common:111</id> in the third row indicates an id element of the question and <q>Are you currently employed?</q> in the fourth row indicates the question itself.

The sixth to ninth rows define a question for requesting an integer value type answer, and <id>Common:222</id> in the seventh row indicates an id element of the question and <q>What is the age of the oldest member of the household who watches television?</q> in the eighth row indicates the question itself. It is to be noted that minInclusive="10"maxInclusive="100" in the sixth row indicates that an answer to the request is restricted to an integer value from 10 or more to 100 or less.

The tenth to 17th rows define a question for requesting an answer selection type answer, and <id>ProviderA:123</id> in the eleventh row indicates an id element of the question and <q>In which of the following sports are you most interested? (Multiple selection allowed)</q> indicates the question itself. Further, <a>Baseball</a> in the 13th row, <a>Basketball</a> in the 14th row, <a>Soccer</a> in the 15th row and <a>Hockey</a> in the 16th row individually indicate choices for an answer to the question. It is to be noted that minChoice="1" maxChoice="3" in the tenth row indicates that the number of answers to the question is restricted from one to three from among the choices.

The eighteenth to 24th rows define a question for requesting an answer selection type answer, and <id>ProviderA:ProgramX:123</id> in the 19th row indicates an id element of the question and <q>Do you enjoy camping and outdoor recreation? (Only one selection)</q> in the 20th row indicates the question itself. Further, <a>Never</a> in the 21st row, <a>Occasionally</a> in the 22nd row and <a>Frequently</a> in the 23rd row individually indicate the choices of an answer to the question. It is to be noted that maxChoice="1" in the 18th row indicates that the number of answers to the question is restricted to one.

In this manner, in the PDI-Q, also candidates for the answer to the question and restriction conditions for the answer are defined depending upon the type of the question.

The 25th to 28th rows define a question for requesting a character column type answer, and <id>ProviderA:321</id> indicates an id element of the question in the 26th row and <q>Who's products are you most interested in recently?</q> in the 27th row indicates the question itself.

In the following description, the questions defined by the PDI-Q in FIG. 7 are referred to as questions of id elements. In particular, the question defined in the second to fifth rows is distinguished as a question of "Common:111" and the question defined in the sixth to ninth rows is distinguished as a question of "Common:222." Further, the question defined in the tenth to 17th rows is distinguished as a question of "ProviderA:123," and the question defined in the 18th to 24th rows is distinguished as a question of "ProviderA:ProgramX:123." Furthermore, the question defined in the 25th to 28th rows is distinguished as a question of "ProviderA:321."

At this time, the question of "Common:111" and the question of "Common:222" are distinguished as the provider common filtering parameter, and the question of "ProviderA:123," question of "ProviderA:ProgramX:123" and question of "ProviderA:321" are distinguished as the provider unique filtering parameter. For example, the question of "Common:111" indicates a question set commonly to providers and having the identifier "111," and the question of "ProviderA:ProgramX:123" indicates a question set by the provider of "Provider A" and whose category or program ID is "ProgramX" and identifier is "123."

Referring back to the flow chart in FIG. 5, at step S12, the PDI-Q generator 41 of the server 11 transmits the generated PDI-Q to the client 12 through the transmission section 42 and supplies the PDI-Q to the PDI-A generator 43.

At step S21, the reception section 51 of the client 12 receives the PDI-Q transmitted from the server 11 and supplies the received PDI-Q to the PDI-A generator 52.

It is to be noted that the PDI-Q is received by the client 12, for example, every time broadcasting or transmission is carried out after a predetermined interval of time from the broadcasting station as the provider in which the server 11 is installed. Or, the PDI-Q may be received by the client 12 when the channel is set to that of the broadcasting station in which the server 11 is installed.

At step S22, the PDI-A generator 52 of the client 12 generates a PDI-A to the questions defined by the PDI-Q received by the reception section 51. In particular, if the PDI-Q from the server 11 is received, then the PDI-A generator 52 causes a display section not shown to display a screen image corresponding to each question defined by the PDI-Q and causes the user or viewer of the client 12 to input or select an answer to the question so that a PDI-A which indicates the answer to the question is generated. In particular, the PDI-A generator 52 interacts with the user to generate the PDI-A which indicates the answer to the question defined by the PDI-Q.

Example of the Screen Image Display in Communication with the User by the PDI-A Generator Here, an example of screen image display in communication with the user by the PDI-A generator 52 is described with reference to FIGS. 8 to 12. It is to be noted that it is assumed here that the client 12 receives the PDI-Q described with reference to FIG. 7, and screen images corresponding to the question group defined by the received PDI-Q are successively displayed on the display section not shown of the client 12.

FIG. 8 shows an example of screen image display corresponding to the question of "Common:111" from among the questions defined by the PDI-Q described hereinabove with reference to FIG. 7. In FIG. 8, the question of "Are you currently employed?" indicated in the fourth row in FIG. 7 is displayed in a question presentation region 61. Further, the message of "choose one" for urging the user to input an answer to the question, a selection button 62-1 for urging the user to select "Yes" as the answer to the question and another selection button 62-2 for urging the user to select "No" as the answer to the question are displayed.

FIG. 9 shows an example of screen image display corresponding to the question of "Common:222" from among the questions defined by the PDI-Q described hereinabove with reference to FIG. 7. In FIG. 9, the question of "What is the age of the oldest member of the household who watches television?" indicated in the eighth row in FIG. 7 is displayed in a question presentation region 71. Further, a message "enter age" for urging the user to input an answer to the question and an answer inputting region 72 for urging the user to input an integer value as the answer to the question are displayed.

FIG. 10 shows an example of screen image display corresponding to the question of "ProviderA:123" from among the questions defined by the PDI-Q described hereinabove with reference to FIG. 7. In FIG. 10, the question of "In which of the following sports are you most interested?

(Multiple selection allowed)" indicated in the twelfth row in FIG. 7 is displayed in a question presentation region 81. Further, the message of "choose one to three answers" for urging the user to input an answer to the question and selection buttons 82-1 to 82-4 for urging the user to select the choices of "Baseball," "Basketball," "Soccer" and "Hockey" as the answer to the question are displayed.

FIG. 11 shows an example of screen image display corresponding to the question of "ProviderA:ProgramX:123" from among the questions defined by the PDI-Q described hereinabove with reference to FIG. 7. In FIG. 11, the question of "Do you enjoy camping and outdoor recreation? (Only one selection)" indicated in the 20th row in FIG. 7 is displayed in a question presentation region 91. Further, the message of "choose one" for urging the user to input an answer to the question and selection buttons 92-1 to 92-3 for urging the user to select the choices of "Never," "Occasionally" and "Frequently" as the answer to the question are displayed.

Figure 12:
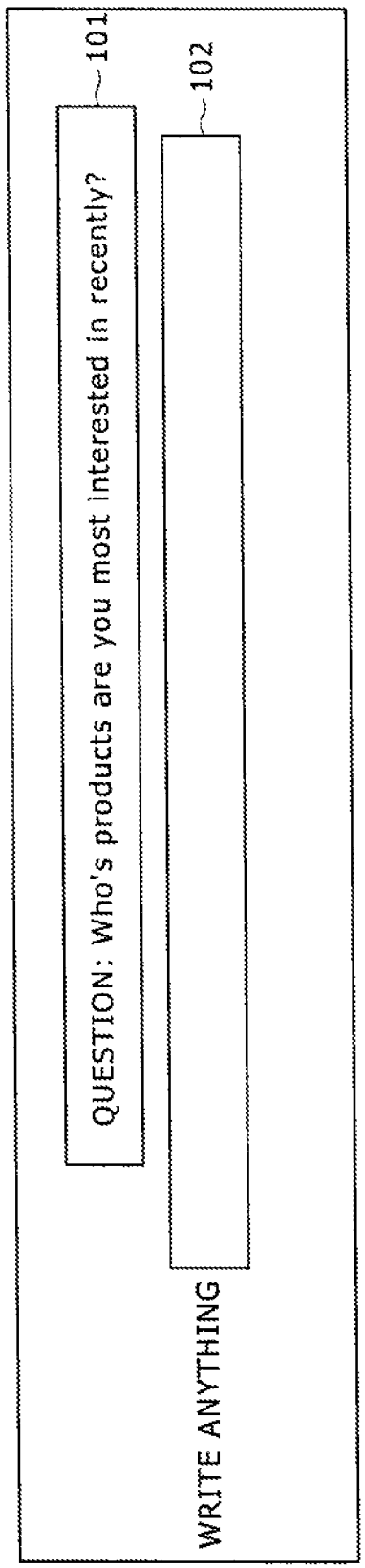

FIG. 12 shows an example of screen image display corresponding to the question of "ProviderA:321" from among the questions defined by the PDI-Q described with reference to FIG. 7. In FIG. 12, the question of "Who's products are you most interested in recently?" indicated in the 27th row in FIG. 7 is displayed in a question presentation region 101. Further, the message of "write anything" for urging the user to input an answer to the question and an answer inputting region 102 for urging the user to input a character string as the answer to the question are displayed.

In this manner, the PDI-A generator 52 urges the user to input or select an answer to the questions defined by the PDI-Q in accordance with the screen image display described with reference to FIGS. 8 to 12 so that the PDI-A corresponding to the PDI-Q is generated.

It is to be noted that the screen image display described with reference to FIGS. 8 to 12 may be carried out just after the PDI-Q is received or may be carried out when, after the PDI-Q is received and retained into the storage section not shown, an instruction to display a setting screen image is issued by the user.

Example of the PDI-A

Here, an example of the PDI-A generated by the PDI-A generator 52 is described with reference to FIG. 13. The PDI-A shown in FIG. 13 is generated based on selection or inputting of answers by the user to the screen image display described with reference to FIGS. 8 to 12.

In particular, the second to fifth rows indicate an answer of the user to the question presented by the screen image display described hereinabove with reference to FIG. 8. In particular, <id>Common:111</id> in the third row indicates an id element of the question presented by the screen image display described with reference to FIG. 8, and <a>true</a> in the fourth row indicates that the selection button 62-1 for the answer of "Yes" in the displaying screen image in FIG. 8 is selected as the answer to the question by the user.

The sixth to ninth rows indicate an answer of the user to the question presented by the screen image display described with reference to FIG. 3. In particular, <id>Common:222</id> in the seventh row indicates an id element of the question presented by the screen image display in FIG. 9, and <a>34</a> in the eighth row indicates that an integer value "34" is inputted as the answer to the question by the user to the answer inputting region 72 in the screen image display in FIG. 9.

The tenth to 15th rows indicate an answer of the user to the question presented by the screen image display described hereinabove with reference to FIG. 10. In particular, <id>ProviderA:123</id> in the eleventh row indicates an id element of the question presented by the screen image display in FIG. 10, and <a>Baseball</a> in the 12th row, <a>Soccer</a> in the 13th row and <a>Hockey</a> in the 14th row indicate that the selection buttons 82-1, 82-3 and 82-4 are selected as the answer to the question by the user in the screen display in FIG. 10, respectively.

The 16th to 19th rows indicate an answer of the user to the question presented by the screen image display described hereinabove with reference to FIG. 11. In particular, <id>ProviderA:ProgramX:123</id> in the 17th row indicates an id element of the question presented by the screen image display in FIG. 11, and <a>Occasionally</a> in the 18th row indicates that the selection button 92-2 is selected as the answer to the question by the user in the screen image display in FIG. 11.

The 20th to 23rd rows indicate an answer of the user to the question presented by the screen image display described hereinabove with reference to FIG. 12. In particular, <id>ProviderA:321</id> on the 21st row indicates the id element of the question presented by the screen image display of FIG. 12. Meanwhile, <a>Somy</a> on the 22nd row indicates that "Somy" is inputted as a character string to the answer inputting region 102 on the screen image display of FIG. 12 by the user as an answer to the question.

The PDI-A generator 52 supplies the PDI-A generated in this manner to the PDI-A storage section 53 so as to be stored. The PDI-A stored in the PDI-A storage section 53 is used when the content distributed from the server 11 conforms to the liking of the user of the client 12 as hereinafter described.

Referring back to the flow chart of FIG. 5, at step S13, the PDI-A generator 43 of the server 11 generates a PDI-A to the questions defined in the PDI-Q from the PDI-Q generator 41 and supplies the generated PDI-A to the metadata distributor 44. More particularly, if a PDI-Q is generated by an operation of the staff of the broadcasting station or provider side, then the PDI-A generator 43 causes the display section not shown to display such screen images which correspond to the questions defined in the PDI-Q as described hereinabove with reference to FIGS. 8 to 12. Then, the PDI-A generator 43 causes the staff of the broadcasting station to input or select answers to the questions to generate a PDI-A representative of the answers. At this time, the staff of the broadcasting station would input or select answers corresponding to the content to be distributed as answers to the questions defined in the PDI-Q. In other words, the PDI-A generated by the PDI-A generator 43 represents information, that is, answers, generated by the provider side taking the liking of the user or viewer of the client 12 into consideration, for allowing the viewer to enjoy a content to be distributed later.

At step S14, the metadata distributor 44 specifies or refers to a content corresponding to the PDI-A from among the contents accumulated in the content accumulation section 45 based on the PDI-A from the PDI-A generator 43. The content specified here may be a content with regard to which the similarity between the PDI-A from the PDI-A generator 43 and the content metadata applied in advance to the accumulated content is higher than a predetermined value or may be a content selected in advance as a content desirable to be viewed by the user by the staff of the broadcasting station. It is to be noted that the content specified by the metadata distributor 44 is acquired from the content accumulation section 45 by the content distributor 46.

At step S15, the metadata distributor 44 newly generates, based on the content metadata applied in advance to the content specified at step S15 and the PDI-A from the PDI-A generator 43, content metadata including the PDI-A.

At step S16, the transmission section 42 distributes the content acquired by the content distributor 46 together with the content metadata generated by the metadata distributor 44. At this time, as the content metadata, content metadata prescribed by a standardization organization may be transmitted in addition to the content metadata generated by the metadata distributor 44.

In this manner, a content whose content metadata includes a PDI-A representative of answers intended by the provider side as the answers to the questions defined in the PDI-Q, or in other words, a content which conforms to the liking of the user and whose viewing is expected by the provider side, is distributed.

It is to be noted that the processes at steps S13 to S16 need not be executed immediately after the process at step S12, but may be executed before a PDI-A is generated and stored in the client 12 owned by each user.

Further, while, at step S16, the content is distributed together with the content metadata, the content may not be distributed together with the content metadata, but after the content metadata including the PDI-A is transmitted in advance to the client 12, the content corresponding to the content metadata may be distributed.

After the content and the content metadata are distributed from the server 11 in this manner, at step S23, the reception section 51 of the client 12 receives the content and the content metadata distributed from the server 11 and supplies them to the content filter 54.

At step S24, the content filter 54 carries out matching between the PDI-A stored in the PDI-A storage section 53 and the PDI-A included in the content metadata from the server 11. It is to be noted that, in order to distinguish the PDI-A stored in the PDI-A storage section 53 and the PDI-A included in the content metadata from the server 11 from each other, the former is hereinafter referred to as user side PDI-A and the latter is hereinafter referred to as provider side PDI-A.

Example of the Matching Process by the Content Filter

Here, it is assumed that the PDI-A described hereinabove with reference to FIG. 13 is generated and stored as the user side PDI-A and the PDI-A illustrated in FIG. 14 is transmitted as the provider side PDI-A from the server 11.

The provider side PDI-A illustrated in FIG. 14 has a basically similar configuration to that of the user side PDI-A illustrated in FIG. 13, and therefore, overlapping description of the provider side PDI-A is omitted herein to avoid redundancy. However, the provider side PDI-A illustrated in FIG. 14 indicates that "false" is selected as an answer to the question of "Common:111" and "Baseball" is selected as an answer to the question of "ProviderA:123" and besides "Never" is selected as an answer to the question of "ProviderA:ProgramX:123."

At this time, the content filter 54 compares the user side PDI-A and the provider side PDI-A with each other. Then, if the user side PDI-A and the provider side PDI-A exhibit coincidence with regard the answers to at least one question, then the content filter 54 decides that the user side PDI-A and the provider side PDI-A match with each other. However, if the user side PDI-A and the provider side PDI-A exhibit no coincidence with regard to the answers to any question, then the content filter 54 decides that the user side PDI-A and the provider side PDI-A do not match with each other. In the present case, the answer to the question of "ProviderA:123" in the user side PDI-A illustrated in FIG. 13 and the answer to the question of "ProviderA:123" in the provider side PDI-A illustrated in FIG. 14 coincide with each other in that both of them include "Baseball." Therefore, it is decided that the user side PDI-A and the provider side PDI-A match with each other.

Then, it is assumed that a PDI-A illustrated in FIG. 15 is transmitted as the provider side PDI-A from the server 11.

The provider side PDI-A illustrated in FIG. 15 indicates that "Basketball" is selected as an answer to the question of "ProviderA:123" and "Never" is selected as an answer to the question of "ProviderA:123."

In this instance, since the answers to the questions in the user side PDI-A illustrated in FIG. 13 and the answers to the questions in the provider side PDI-A illustrated in FIG. 15 do not coincide with each other at all, it is decided that the user side PDI-A and the provider side PDI-A do not match with each other.

The content filter 54 carries out the matching process between the user side PDI-A and the provider side PDI-A in this manner.

At step S25, the content filter 54 decides whether or not the user side PDI-A and the provider side PDI-A match with each other. If it is decided at step S25 that the user side PDI-A and the provider side PDI-A match with each other, then the content filter 54 decides that the content distributed from the server 11 conforms to the liking of the user or viewer of the client 12. Thus, the content filter 54 supplies the content to the content reproduction section 55 or the content accumulation section 56, and then the processing advances to step S26.

If the content distributed from the server 11 is supplied from the content filter 54 to the content reproduction section 55, then the content reproduction section 55 reproduces the content at step S26. On the other hand, if the content distributed from the server 11 is supplied from the content filter 54 to the content accumulation section 56, then the content accumulation section 56 accumulates or records the content at step S26. The accumulated content is suitably supplied to and reproduced by the content reproduction section 55 in response to an operation instruction of the user.

On the other hand, if it is decided at step S25 that the user side PDI-A and the provider side PDI-A do not match with each other, then the content filter 54 decides that the content distributed from the server 11 does not conform to the liking of the user or viewer of the client 12. Then, the content filter 54 abandons or deletes the content, and the processing is ended.

According to the process described above, in the broadcasting system, on the provider side, the server generates a PDI-Q representative of questions regarding the liking of the user, and the PDI-Q is transmitted to the client terminal. Further, a provider side PDI-A representative of answers set by the provider side to the PDI-Q is distributed as metadata of the corresponding content. Consequently, as content metadata, content metadata in accordance with needs at the time other than content metadata prescribed by a standardization organization can be applied to a content. On the other hand, on the user side, the client terminal generates a user side PDI-A representative of answers of the user to the PDI-Q from the server. Then, matching between the generated user side PDI-A and the provider side PDI-A from the server is carried out to determine whether or not the content distributed from the server should be acquired. Consequently, a content can be filtered with content metadata which satisfies needs at the time other than content metadata prescribed by a standardization organization. Accordingly, a content which satisfies current needs can be acquired.

It is to be noted that, while, in the foregoing description, the client 12 carries out matching between the PDI-As on the real time basis upon distribution of a content from the server 11, all contents may be accumulated upon distribution of such contents from the server 11. In this instance, matching between the PDI-As may be carried out on the background of the processing such that a content corresponding to a matched PDI-A, that is, a matched provider side PDI-A, from among the accumulated contents is reproduced or a content which corresponds to any PDI-A which does not match is deleted.

Further, in the foregoing description, the content filter 54 compares a user side PDI-A and a provider side PDI-A represented as instances, and matching between the user side PDI-A and the provider side PDI-A is carried out depending upon whether or not answers to at least one question coincide with each other. However, the user side PDI-A and the provider side PDI-A may be compared with each other by representing one of the user side PDI-A and the provider side PDI-A as a query for evaluating the PDI-A.

In the following, a configuration for comparing a user side PDI-A and a provider side PDI-A with each other by representing one of the user side PDI-A and the provider side PDI-A as a query is described.

Example 1 of the Matching Process by an Query for Evaluating a PDI-A

First, a configuration for representing a provider side PDI-A as a query and comparing a user side PDI-A and the provider side PDI-A with each other is described.

Figure 16:
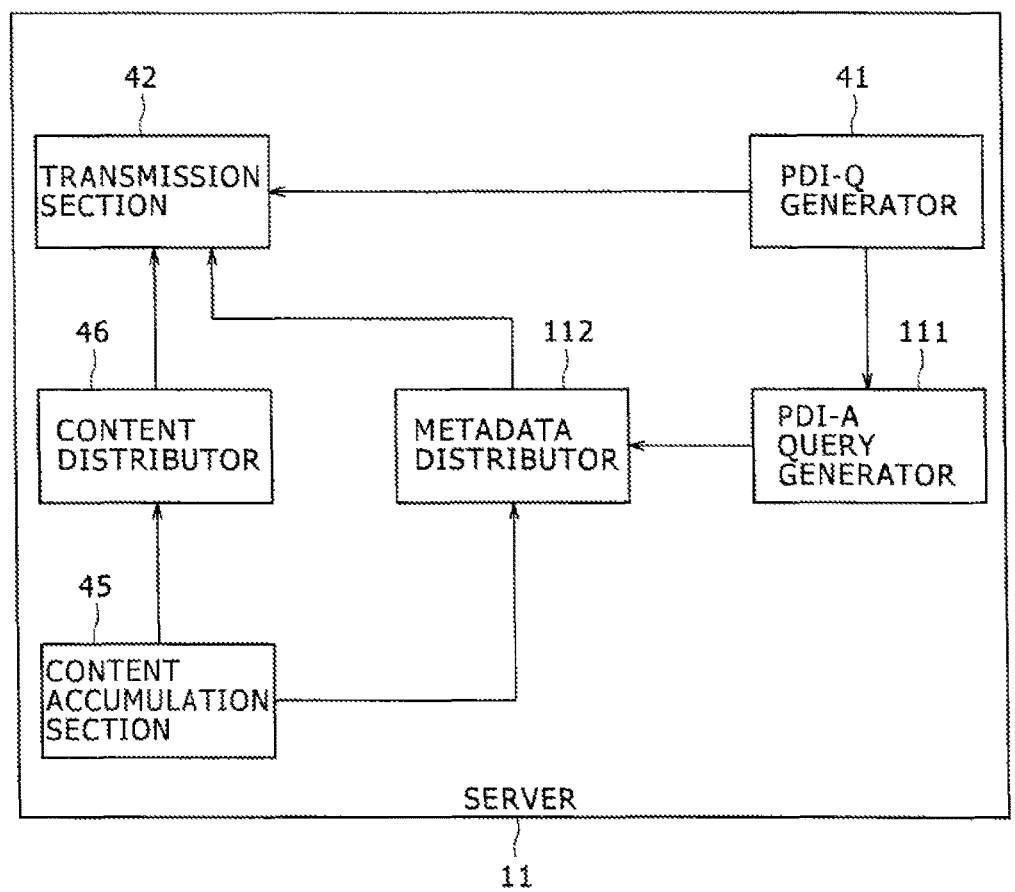
FIG. 16 is a block diagram showing another example of a functional configuration of the server.

FIG. 16 shows an example of a functional configuration of the server 11 which represents a provider side PDI-A as a query.

Referring to FIG. 16, the server 11 shown includes a PDI-Q generator 41, a transmission section 42, a content accumulation section 45, a content distributor 46, a PDI-A query generator 111 and a metadata distributor 112.

Figure 3:
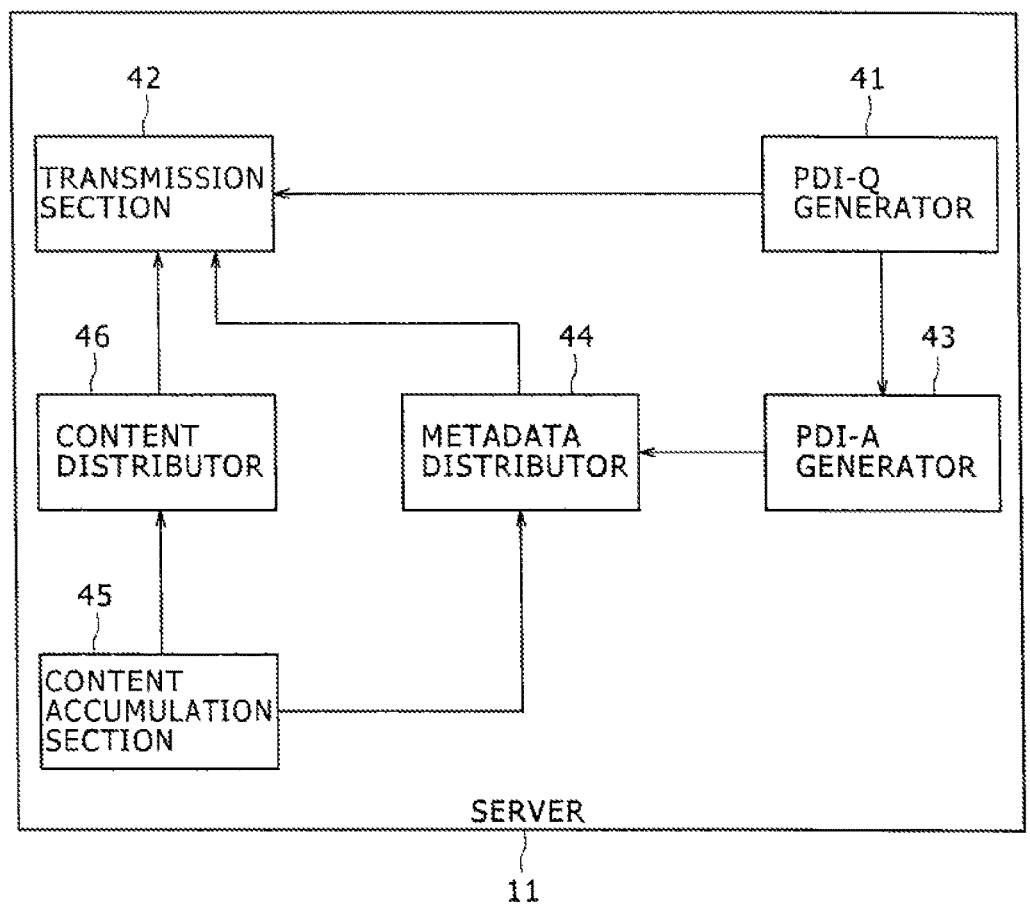
FIG. 3 is a block diagram showing a functional configuration of the server.

It is to be noted that, in the server 11 of FIG. 16, like elements having like functions to those of the elements provided in the server 11 of FIG. 3 are denoted by like terms and like reference characters and overlapping description of them is suitably omitted herein to avoid redundancy.

In particular, the server 11 of FIG. 16 is different from the server 11 of FIG. 3 in that it includes the PDI-A query generator 111 and the metadata distributor 112 in place of the PDI-A generator 43 and the metadata distributor 44.

The PDI-A query generator 111 generates, based on a PDI-Q from the PDI-Q generator 41, a PDI-A corresponding to the PDI-Q, that is, a provider side PDI-A, applies the generated provider side PDI-A to a predetermined conditional statement to generate a PDI-A query and supplies the PDI-A query to the metadata distributor 112.

The metadata distributor 112 specifies or refers to, based on the PDI-A query from the PDI-A query generator 111, a content corresponding to the PDI-A query from among contents accumulated in the content accumulation section 45. The metadata distributor 112 generates content metadata including the PDI-A query as content metadata of the specified content and transmits the generated content metadata to the client 12 through the transmission section 42.

Figure 4:
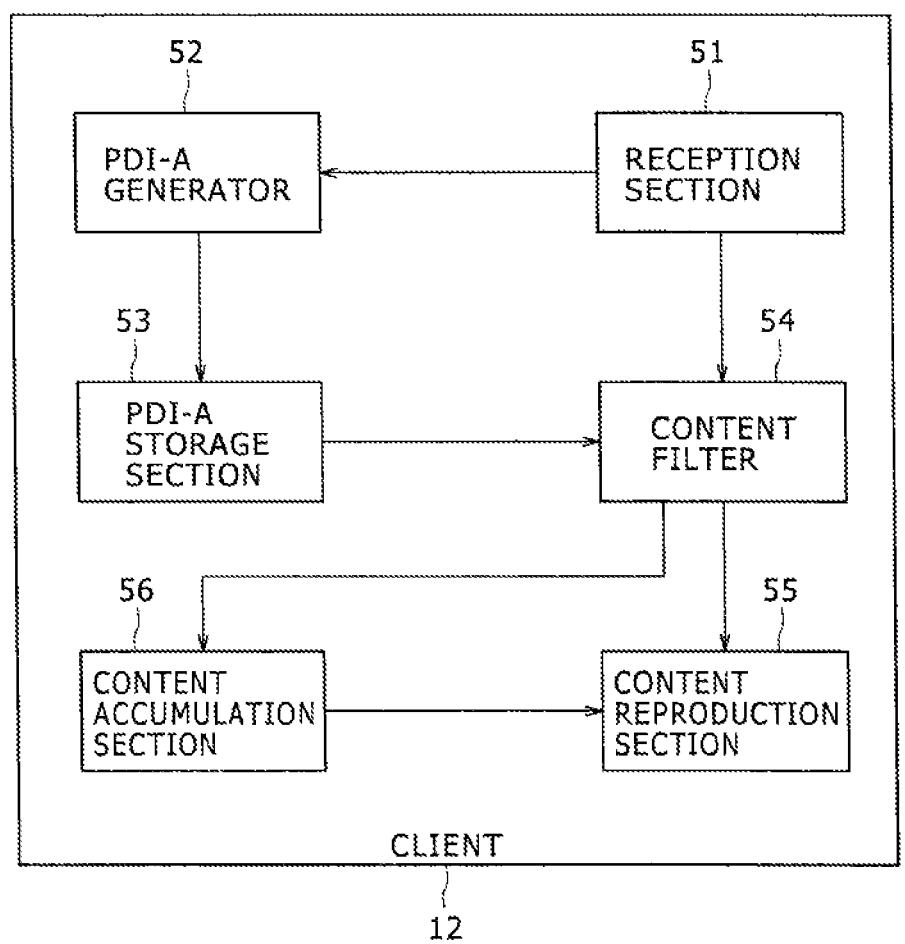
FIG. 4 is a block diagram showing an example of a functional configuration of a client.

In the client 12 in the present example, the content filter 54 shown in FIG. 4 reads out a PDI-A, that is, a user side PDI-A, from the PDI-A storage section 53, and filters the content based on the read out user side PDI-A and the PDI-A query included in the content metadata transmitted from the server 11 to the client 12. Except this, the client 12 is same as the client 12 of FIG. 4, and therefore, overlapping description of the same is omitted herein to avoid redundancy.

Now, content transmission and reception processes of the broadcasting system 10 which includes the server 11 of FIG. 16 are described with reference to a flow chart of FIG. 17.

Figure 17:
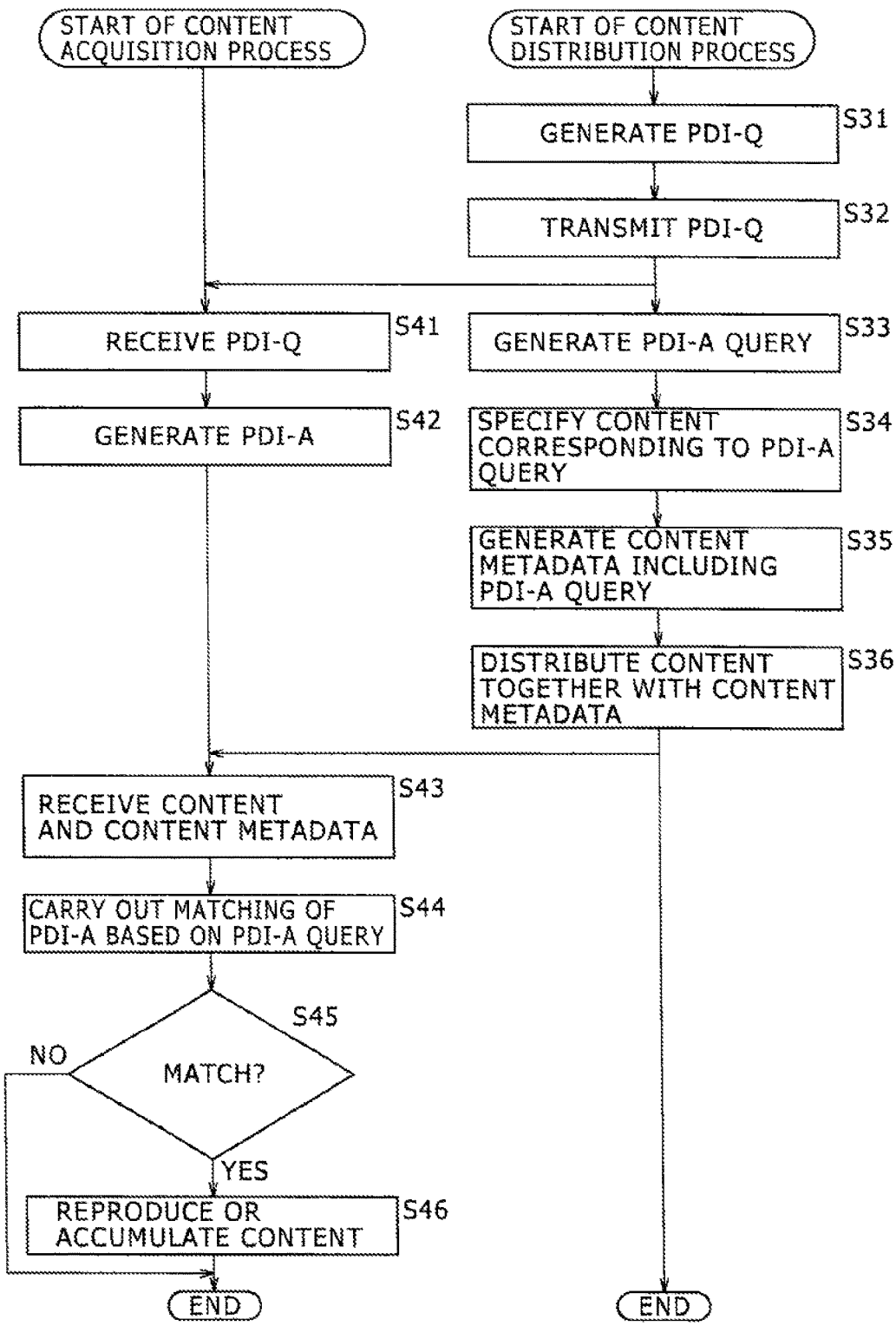
FIG. 17 is a flow chart illustrating different content transmission and reception processes in the broadcasting system which includes the server of FIG. 16.

It is to be noted that processes at steps S31, S32, S36, S41 to S43, S45 and S46 of the flow chart of FIG. 17 are basically similar to the processes at steps S11, S12, S16, S21 to S23, S25 and S26 of the flow chart of FIG. 5, respectively. Therefore, overlapping description of them is omitted herein to avoid redundancy.

In particular, at step S33, the PDI-A query generator 111 of the server 11 generates a provider side PDI-A to questions defined by the PDI-Q from the PDI-Q generator 41 and applies the generated provider side PDI-A to a predetermined conditional statement to generate a PDI-A query. Then, the PDI-A query generator 111 supplies the generated PDI-A query to the metadata distributor 112. In particular, for example, if a PDI-Q is generated by an operation of staff of a broadcasting station, that is, the provider side, then the PDI-A query generator 111 causes the display section not shown to successively display such screen images corresponding to the questions defined by the PDI-Q as described hereinabove with reference to FIGS. 8 to 12. Then, the PDI-A query generator 111 causes the staff of the broadcasting station to input or select answers to the questions and causes the staff to determine a combination of the answers, that is, a filtering condition, to generate a PDI-A query representative of the combination of the answers. At this time, the staff of the broadcasting station would input or select answers corresponding to a content to be distributed as answers to the questions defined in the PDI-Q and then determine a combination of the answers. In other words, the PDI-A query generated by the PDI-A query generator 111 represents information, that is, a combination of answers, generated by the provider side taking a liking of a user or viewer of the client 12 into consideration, for allowing the viewer to enjoy a content to be distributed later.

At step S34, the metadata distributor 112 specifies or refers to, based on the PDI-A query from the PDI-A query generator 111, a content corresponding to the PDI-A query from among the contents accumulated in the content accumulation section 45. The content specified here may be a content with regard to which the similarity between the PDI-A query from the PDI-A query generator 111 and the content metadata applied in advance to the accumulated content is higher than a predetermined value or may be a content selected in advance as a content desirable to be enjoyed by the user by the staff of the broadcasting station. It is to be noted that the content specified by the metadata distributor 112 is acquired from the content accumulation section 45 by the content distributor 46.

At step S35, the metadata distributor 112 newly generates, based on the content metadata applied in advance to the content specified at step S34 and the PDI-A query from the PDI-A query generator 111, content metadata including the PDI-A query.

Then, at step S44, the content filter 54 of the client 12 carries out matching of the PDI-A stored in the PDI-A storage section 53 based on the PDI-A query included in the content metadata from the server 11.

Here, it is assumed that the PDI-A described hereinabove with reference to FIG. 13 is generated and stored as the user side PDI-A and a PDI-A query indicated below has been transmitted from, the server 11.

"//QBA[id='Common:111' and a='true'] and //QSA [id='ProviderA:123' and a='Baseball']"

The PDI-A query given above indicates that the user side PDI-A evaluates whether "true" is selected as the answer to the question of "Common:111" and "Baseball" is selected as an answer to the question of "ProviderA:123."

At this time, the content filter 54 evaluates the user side PDI-A based on the PDI-A query. Then, if the user side PDI-A satisfies the PDI-A query, that is, is true, then the content filter 54 decides that the user side PDI-A and the PDI-A query match with each other, but if the PDI-A query is not satisfied, that is, is false, then the content filter 54 decides that the user side PDI-A and the PDI-A query do not match with each other. In this instance, in the user side PDI-A illustrated in FIG. 13, since "true" is selected as an answer to the question of "Common:111" and besides "Baseball" is selected as an answer to the question of "ProviderA:123," it is decided that the user side PDI-A and the PDI-A query match with each other.

Since a more complicated filtering condition is represented by a PDI-A query set by the provider side in this manner, the provider side can allow a user or viewer who is expected to view a content by the provider to acquire a content.

Example 2 of the Matching Process by a Query for Evaluating a PDI-A

Now, a configuration which represents a user side PDI-A as a query to compare the user side PDI-A and a provider side PDI-A with each other is described.

Figure 18:
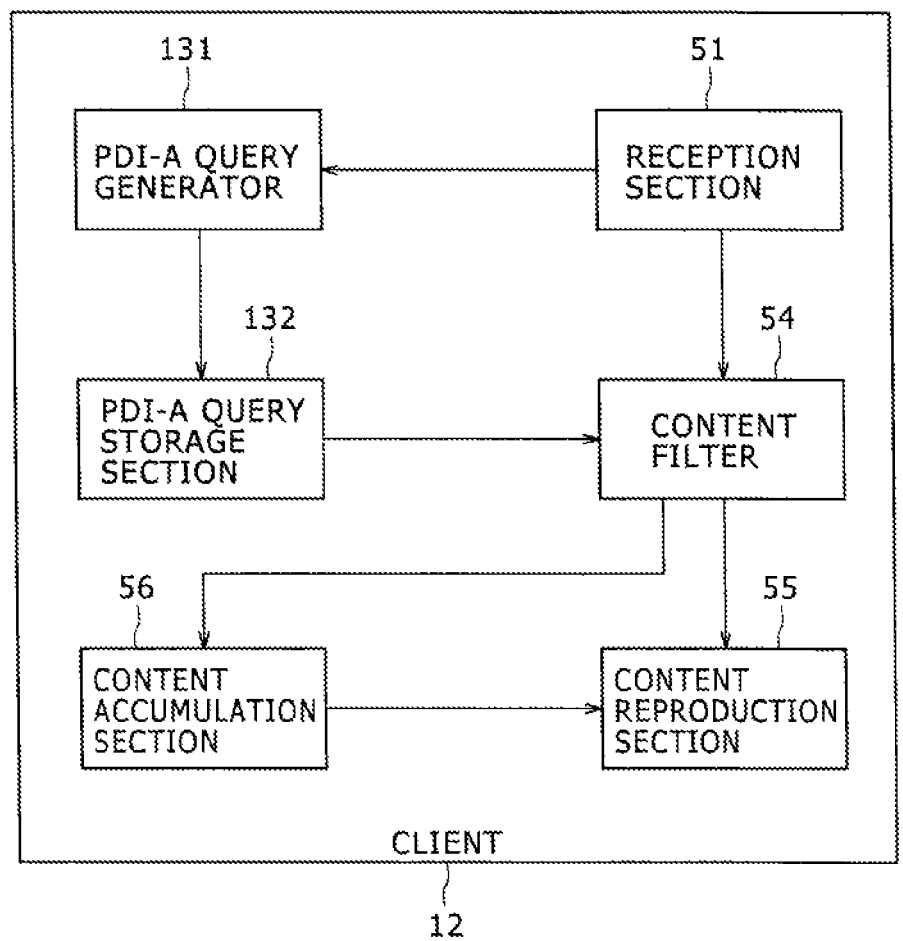
FIG. 18 is a block diagram showing another example of a functional configuration of the client.

FIG. 18 shows an example of a functional configuration of the client 12 which represents a user side PDI-A as a query.

The client 12 of FIG. 18 includes a reception section 51, a content filter 54, a content reproduction section 55, a content accumulation section 56, a PDI-A query generator 131, and a PDI-A query storage section 132.

It is to be noted that, in the client 12 of FIG. 18, like elements having like functions to those of the elements provided in the client 12 of FIG. 4 are denoted by like terms and like reference characters and overlapping description of them is suitably omitted herein to avoid redundancy.

In particular, the client 12 of FIG. 18 is different from the client 12 of FIG. 4 in that it includes the PDI-A query generator 131 and the PDI-A query storage section 132 in place of the PDI-A generator 52 and the PDI-A storage section 53.

The PDI-A query generator 131 generates, based on a PDI-Q transmitted thereto from the server 11, a PDI-A, that is, a user side PDI-A, corresponding to the PDI-Q and representative of answers of a user to questions about the liking of the user of the client 12. Then, the PDI-A query generator 131 applies the generated user side PDI-A to a predetermined conditional statement to generate a PDI-A query and supplies the generated PDI-A query to the PDI-A query storage section 132.

The PDI-A query storage section 132 stores the PDI-A query from the PDI-A query generator 131. The PDI-A query stored in the PDI-A query storage section 132 is read out suitably into the content filter 54.

It is to be noted that the content filter 54 of FIG. 18 reads out the PDI-A query from the PDI-A storage section 53 and filters the content based on the read out PDI-A query and the provider side PDI-A included in the content metadata transmitted thereto from the server 11.

The server 11 in the present example is same as the server 11 shown in FIG. 3, and therefore, overlapping description thereof is omitted herein to avoid redundancy.

Now, content transmission and reception processes of the broadcasting system 10 which includes the client 12 of FIG. 18 are described with reference to a flow chart of FIG. 19.

Figure 19:
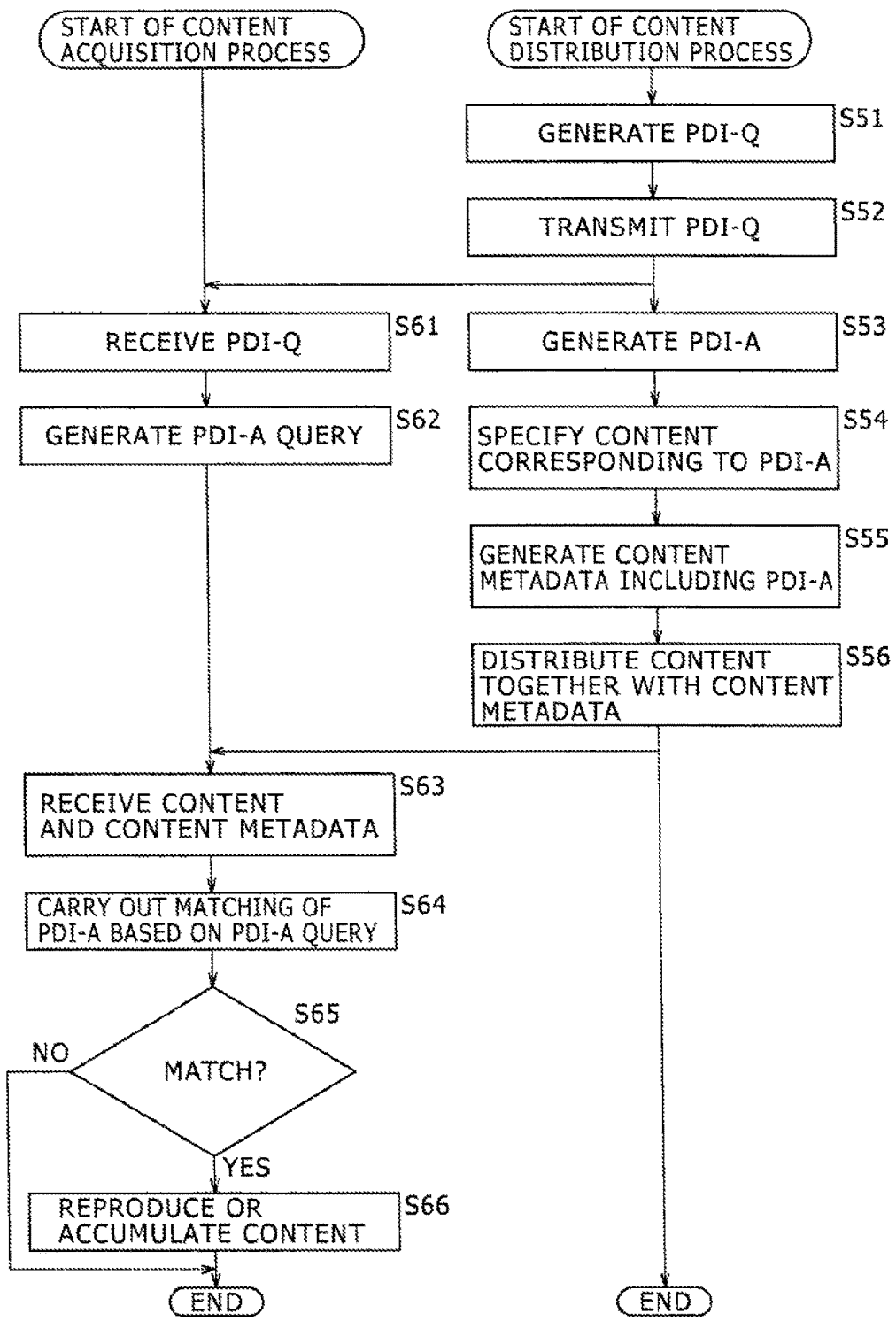
FIG. 19 is a flow chart illustrating content transmission and reception processes in the broadcasting system of FIG. 1 which includes the client of FIG. 18.

It is to be noted that processes at steps S51 to S61, S63, S65 and S66 of the flow chart of FIG. 19 are basically similar to the processes at steps S11 to S21, S23, S25 and S26, respectively, and therefore, overlapping description of them is omitted herein to avoid redundancy.

In particular, at step S62, the PDI-A query generator 131 of the client 12 generates a user side PDI-A to questions defined in a PDI-Q received by the reception section 51 and applies the generated user side PDI-A to a predetermined conditional statement to generate a PDI-A query. In particular, for example, when a PDI-Q is received from a broadcasting station, the PDI-A query generator 131 causes the display section not shown to display such screen images which correspond to the question defined in the PDI-Q as described hereinabove with reference to FIGS. 8 to 12. Then, the PDI-A query generator 131 causes the user or viewer of the client 12 to input or select answers to the questions and causes the user to determine a combination or filtering condition of the answers to generate a PDI-A query representative of the combination of the answers. In other words, the PDI-A query generator 131 interacts with the user to generate a PDI-A query representative of the combination of answers to the questions defined by the PDI-Q.

Then at step S64, the content filter 54 carries out matching of the provider side PDI-A included in the content metadata from the server 11 based on the PDI-A query stored in the PDI-A query storage section 132.

Here, it is assumed that the PDI-A described hereinabove with reference to FIG. 14 is transmitted as the provider side PDI-A from the server 11 and a PDI-A query given below is generated and stored.

"//QBA[id='Common:111' and a='false'] and //QSA [id='ProviderA:123' and a='Baseball']"

The PDI-A query given above indicates that the provider side PDI-A evaluates whether "false" is selected as the answer to the question of "Common:111" and "Baseball" is selected as an answer to the question of "ProviderA:123."

At this time, the content filter 54 evaluates the provider side PDI-A based on the PDI-A query. Then, if the provider side PDI-A satisfies the PDI-A query, that is, is true, then the content filter 54 decides that the provider side PDI-A and the PDI-A query match with each other, but if the PDI-A query is not satisfied, that is, is false, then the content filter 54 decides that the provider side PDI-A and the PDI-A query do not match with each other. In this instance, in the provider side PDI-A illustrated in FIG. 14, since "false" is selected as an answer to the question of "Common:111" and besides "Baseball" is selected as an answer to the question of "ProviderA:123," it is decided that the provider side PDI-A and the PDI-A query match with each other.

Since a more complicated filtering condition is represented by a PDI-A query set by the user side in this manner, it is possible to allow the user side to acquire a content expected thereby with a higher degree of certainty.

Incidentally, although the present invention can be applied to a broadcasting system which broadcasts a digital television program, as an example, the present invention can be applied to a broadcasting system which broadcasts in accordance with the ATSC-M/H (Mobile/Handheld) method which is an expanded method of the ATSC (Advanced Television Standard Committee) method to mobile communication.

Figure 20:
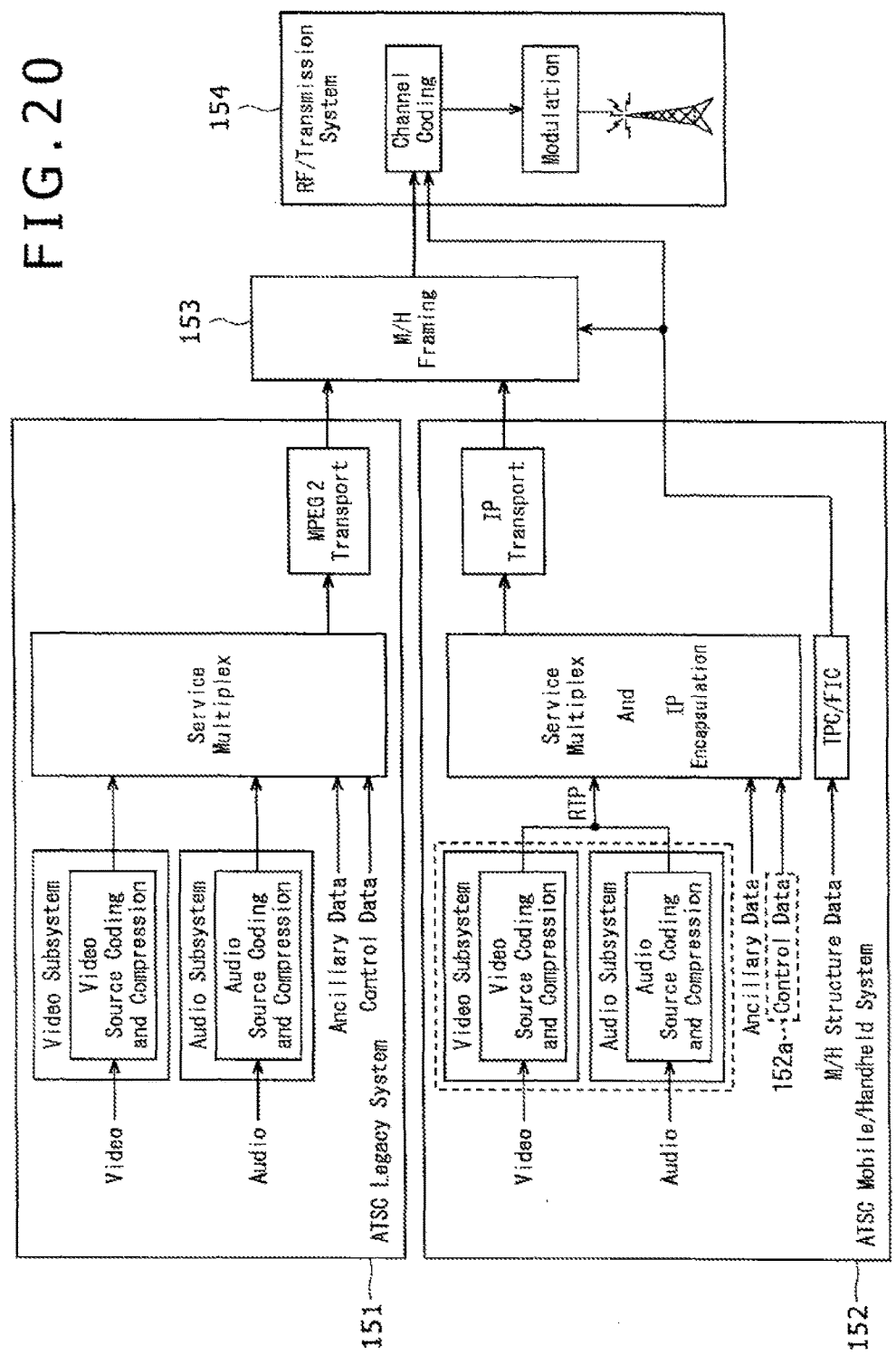
FIG. 20 is a block diagram showing an example of a broadcasting system for broadcasting by an ATSC-M/H method to which the present invention is applied.

Application Example to a Broadcasting System which Broadcasts by the ATSC-M/H Method FIG. 20 shows an example of a configuration of a broadcasting system which broadcasts digital television programs of the ATSC method and the ATSC-M/H method in related arts.

The broadcasting system of FIG. 20 corresponds to the server 11 of the broadcasting system 10 of FIG. 1 and includes an ATSC Legacy System 151, an ATSC M/H System 152, an M/H Framing 153 and an RF/Transmission System 154.

The ATSC Legacy System 151 signals a broadcasting stream in the form of an MPEG2-TS (Moving Picture Experts Group 2 Transport Stream) in accordance with the ATSC method in related arts. The ATSC M/H System 152 signals a broadcasting stream of IP packets in accordance with the ATSC-M/H method. Control Data 152a of the ATSC M/H System 152 is control information regarding a broadcasting stream (A/V (Audio/Video) content) to be signaled from the ATSC M/H System 152.

Broadcasting streams described above are multiplexed by the M/H Framing 153 and transmitted as a carrier by the RF/Transmission System 154. It is to be noted that description of details of functions of the blocks mentioned is omitted herein because they are described in the ATSC standards.

Figure 21:
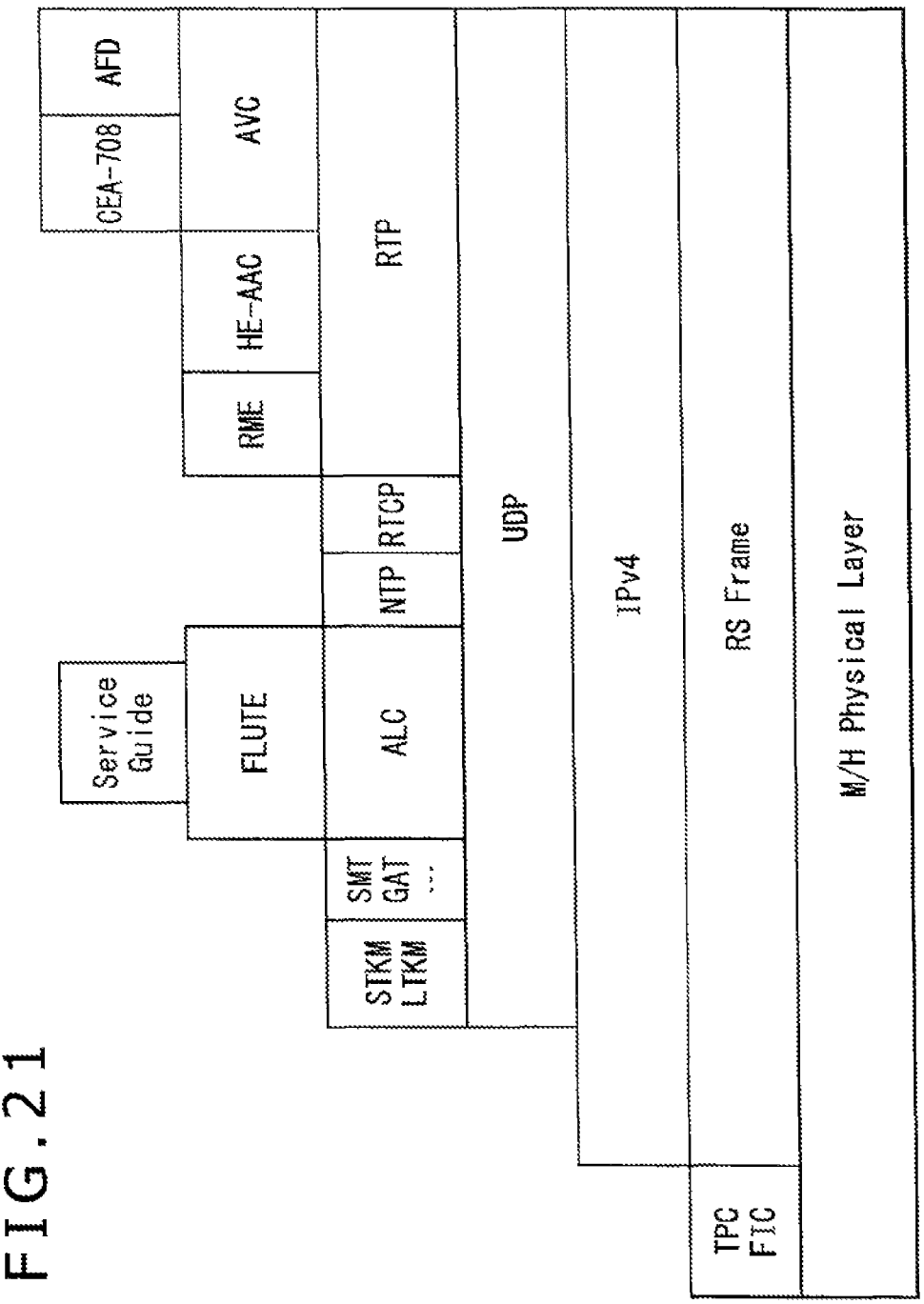
FIG. 21 is a diagrammatic view illustrating a protocol stack of a signal of a carrier transmitted by the ATSC-M/H method.

FIG. 21 illustrates a protocol stack of a signal of a broadcasting wave transmitted in accordance with the ATSC-M/H method.

Although detailed description is omitted, one of the highest hierarchies is "Service Guide" and prescribes metadata of a content to be provided in accordance with the ATSC-M/H method. The Control Data 152a illustrated in FIG. 20 is transmitted as content metadata (hereinafter referred to merely as Service Guide) prescribed by "Service Guide." In particular, in the broadcasting system of FIG. 20, a PDI-A, that is, a provider side PDI-A, a PDI-A query or a PDI-Q transmitted from the server 11 to the client 12 in the broadcasting system 10 described hereinabove is placed in and transmitted together with the Service Guide.

It is to be noted that a lower hierarchy "FLUTE" adjacent to the "Service Guide" and a lower hierarchy "ALC" adjacent to the "FLUTE" are hierarchies for transferring the Service Guide packetized in accordance with the UDP/IP (User Datagram Protocol/Internet Protocol).

Figure 22:
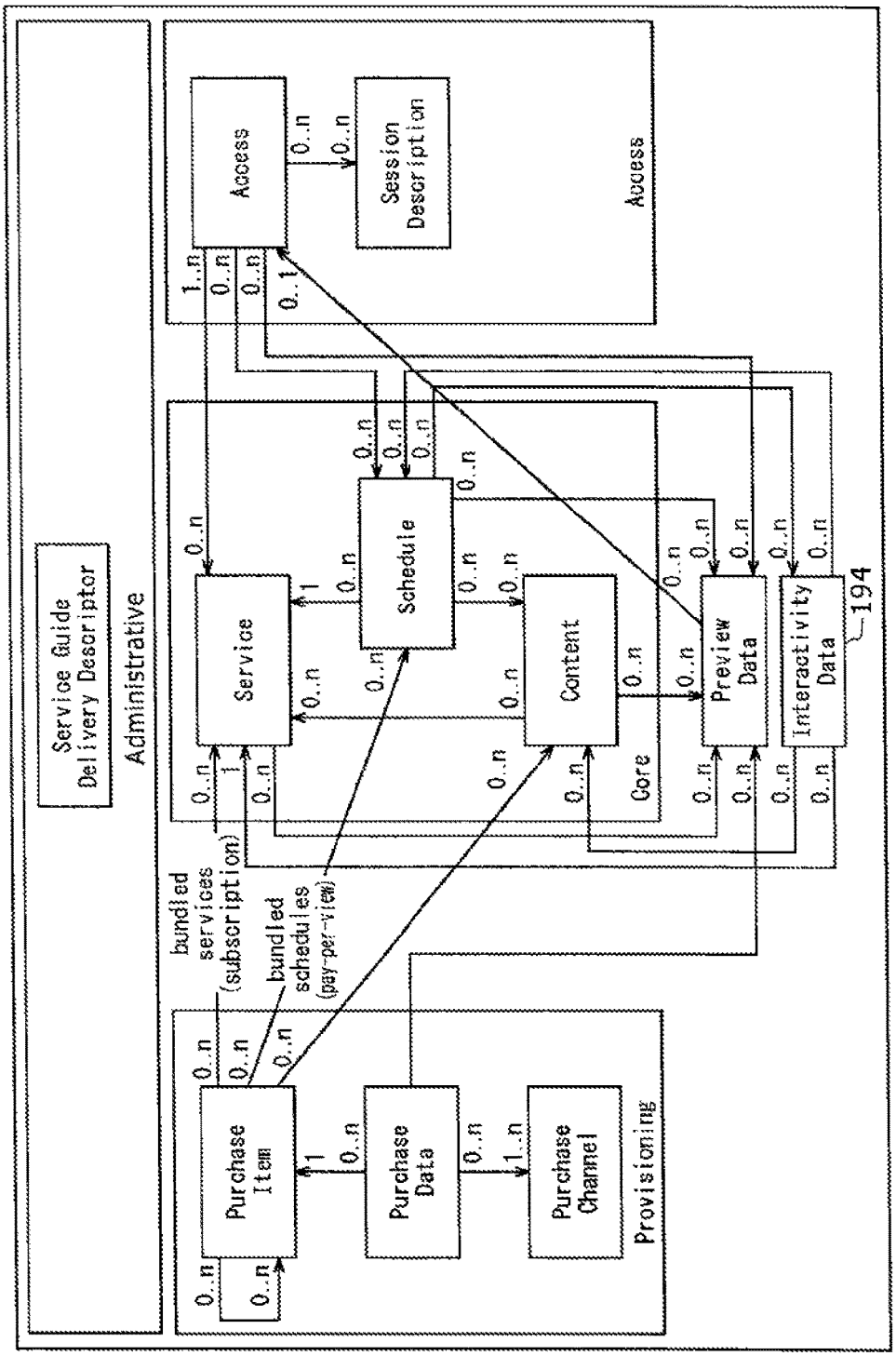
FIG. 22 is a block diagram illustrating a data configuration of Service Guide.

As specifications of the Service Guide, a data configuration illustrated in FIG. 22 is prescribed by the OMA (Open Mobile Alliance). It is to be noted that description of details of the configuration of the Service Guide illustrated in FIG. 22 is omitted herein because it is prescribed in "'Service Guide for Mobile Broadcast Services,' Open Mobile Alliance, OMA-TSBCAST_ServiceGuide-V1_0, Candidate Version 1.0."

The PDI-A, that is, the provider side PDI-A, or the PDI-A query, is placed into at least one of a "Service" fragment, a "Schedule" fragment and a "Content" fragment among components of the Service Guide illustrated in FIG. 22.

The "Service" fragment is metadata including control information regarding the substance of a channel service, and FIG. 23 illustrates details of a configuration of the "Service" fragment. A PDI-A or a PDI-A query is placed into a "PrivateExt" element prescribed on the lowest stage of the "Service" fragment illustrated in FIG. 23 by newly adding a "PDI-A" element to the "PrivateExt" element. More particularly, for example, the "PDI-A" element is represented by a character string as <xs:element name="PDI-A" type="xs:string" xmlns:xs="http://www.w3.org/2001/XMLschema"/> in accordance with the XML schema and is then encoded.

The "Schedule" fragment is metadata including control information regarding a distribution schedule of a content, that is, a digital television program, and FIG. 24 illustrates details of a configuration of the "Schedule" fragment. A PDI-A or a PDI-A query is placed into a "PrivateExt" element prescribed on the lowest stage of the "Schedule" fragment illustrated in FIG. 24 by newly adding a "PDI-A" element to the "PrivateExt" element. More particularly, for example, the "PDI-A" element is represented by a character string as <xs:element name="PDI-A" type="xs:string" xmlns:xs="http://www.w3.org/2001/XMLschema"/> in accordance with the XML schema and is then encoded.

The "Content" fragment is metadata including control information regarding the substance of a content, that is, a digital television program, and FIG. 25 illustrates details of a configuration of the "Content" fragment. A PDI-A or a PDI-A query is placed into a "PrivateExt" element prescribed on the lowest stage of the "Content" fragment illustrated in FIG. 25 by newly adding a "PDI-A" element to the "PrivateExt" element. More particularly, for example, the "PDI-A" element is represented by a character string as <xs:element name="PDI-A" type="xs:string" xmlns:xs="http://www.w3.org/2001/XMLschema"/> in accordance with the XML schema and is then encoded.

Meanwhile, the PDI-Q is placed into "Interactivity Data" from among the components of the Service Guide illustrated in FIG. 22.

Figure 26:
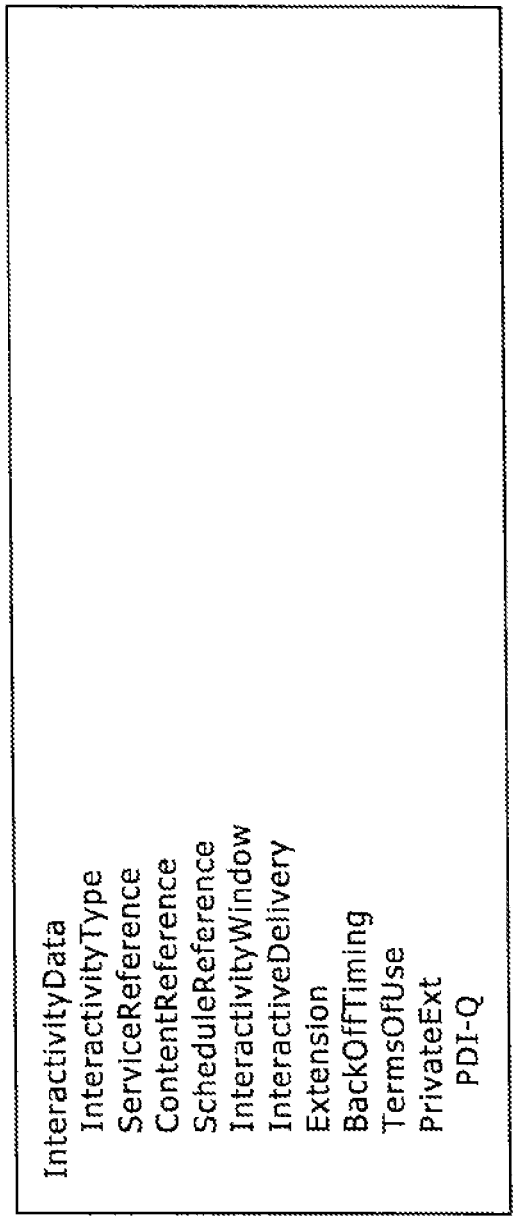
FIG. 26 is a view illustrating a configuration of an Interactivity Data fragment.

The "Interactivity Data" fragment is metadata regarding an application regarding a channel service or a content, that is, a digital television program, and FIG. 26 illustrates details of a configuration of the "Interactivity Data" fragment. A PDI-Q is placed into a "PrivateExt" element prescribed on the lowest stage of the "Interactivity Data" fragment illustrated in FIG. 26 by newly adding a "PDI-Q" element to the "PrivateExt" element. More particularly, the "PDI-Q" element is represented by a character string as <xs:element name="PDI-Q" type="xs:string" xmlns:xs="http://www.w3.org/2001/XMLschema"/> in accordance with the XML schema and is then encoded.

While the foregoing description relates to an example wherein the present invention is applied to a broadcasting system which broadcasts in accordance with the ATSC-M/H method, the present invention can be applied also to a broadcasting system which carries out NRT (Non-Real Time) broadcasting in accordance with the ATSC system in related arts. Since the NRT broadcasting does not assume viewing of a content on the real time basis, there is no necessity to reproduce a content in synchronism with the broadcasting time of the content broadcast as data in the form of a broadcasting signal.

Figure 27:
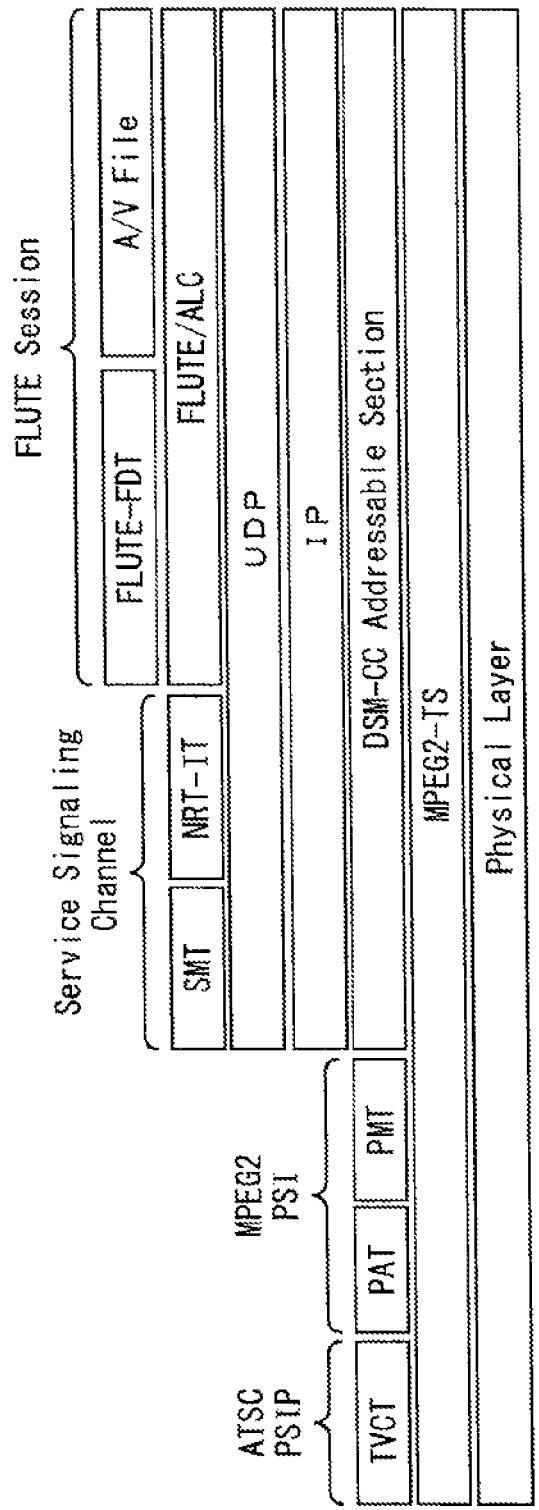
FIG. 27 is a diagrammatic view illustrating a protocol stack of a signal of a carrier transmitted by NRT broadcasting.

Application Example to a Broadcasting System which Carries Out NRT Broadcasting FIG. 27 illustrates a protocol stack of a signal of a broadcasting wave transmitted by NRT broadcasting.

Although detailed description is omitted, the lowermost layer is "Physical Layer" and corresponds to a frequency band of a broadcasting wave. An upper layer adjacent to the "Physical Layer" is "MPEG2-TS" and corresponds to a broadcasting stream broadcast as a broadcasting wave.

"ATSC-PSIP (Program and System Information Protocol)" and "MPEG2-PSI (Program Specific Information)" are illustrated as higher layers adjacent to "MPEG2-TS."

"ATSC-PSIP" is a layer having TVCT, and "MPEG2-PSI" is a layer having PAT (Program Association Table) and PMT (Program Map Table).

Meanwhile, "DSM-CC (Digital Storage Media Command and Control) Addressable Section" is indicated as an upper layer adjacent to "MPEG2-TS." "DSM-CC Addressable Section" is used as an adaptation layer for transferring an IP packet on MPEG2-TS of a broadcasting stream.

Figure 28:
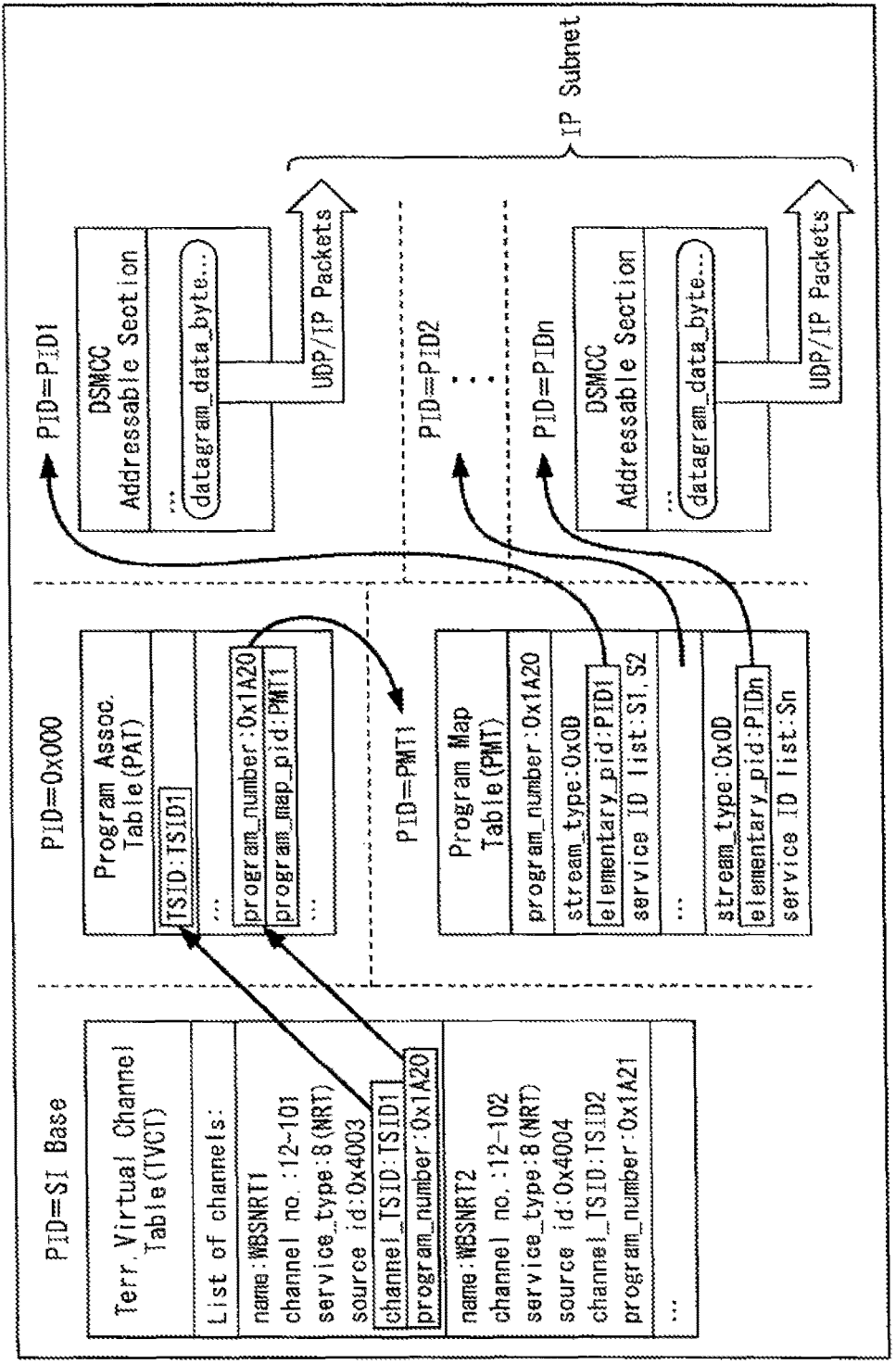
FIG. 28 is a diagrammatic view illustrating a data structure of TVCT, PAT, PMT and DSM-CC Addressable Section.

FIG. 28 illustrates a data structure of TVCT, PAT, PMT and DSM-CC Addressable Section. In TVCT, control information regarding a broadcasting stream to be broadcast by MPEG2-TS is described, and an MPEG2-TS by which DSM-CC Addressable Section for transferring an IP packet stream (UDP/IP Packet) is specified based on TVCT.

Referring back to FIG. 27, "IP" is indicated as an upper layer adjacent to "DSM-CC Addressable Section," and "UDP" is indicated as a further higher layer adjacent to "IP."

"Service Signaling Channel" and "FLUTE/ALC (File Delivery over Unidirectional Transport/Asynchronous Layered Coding Protocol)" are indicated as higher layers adjacent to "UDP." "Service Signaling Channel" is a layer having SMT (Service Map Table) and NRT-IT (NRT Information Table). "FLUTE Session" is indicated as a higher layer adjacent to "FLUTE/ALC." "FLUTE Session" is a layer having FLUTE-FDT (File Delivery Table) and A/V File.

Figure 29:
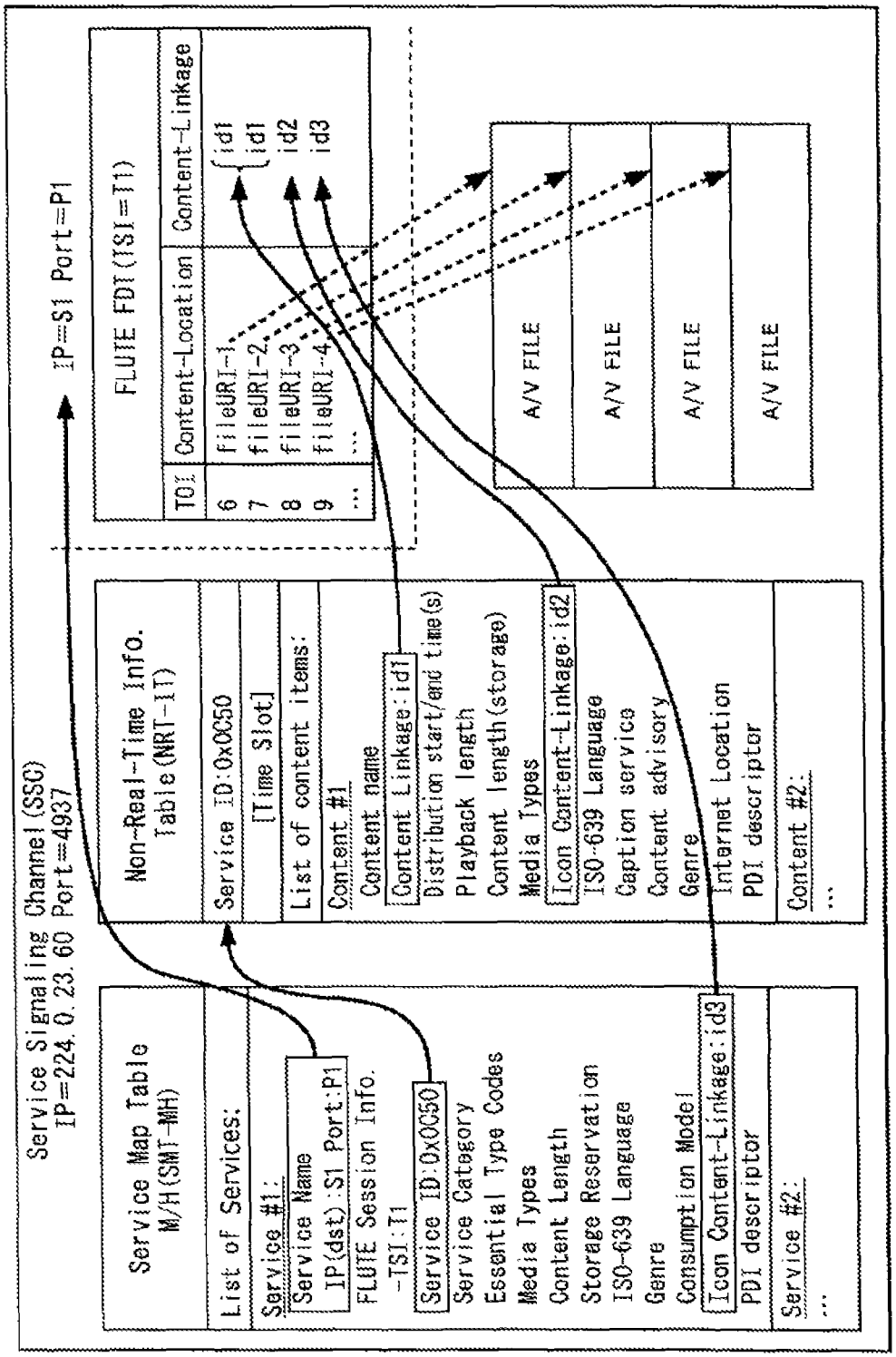
FIG. 29 is a diagrammatic view illustrating a data structure of SMT, NRT-IT and FLUTE FDT.

FIG. 29 illustrates a data structure of SMT, NRT-IT and FLUTE FDT. SMT describes metadata regarding a channel, and NRT-IT described metadata regarding a content. SMT and NRT-IT are transferred by "Service Signaling Channel" described hereinabove. FLUTE FDT describes information for identifying A/V files. It is to be noted that an A/V file is transferred by "FLUTE/ALC."

Here, in a broadcasting system which carries out NRT broadcasting, a PDI-A, that is, a provider side PDI-A, a PDI-A query or a PDI-Q to be transmitted from the server 11 to the client 12 in the broadcasting system 10 described hereinabove is placed into and transmitted together with SMT or NRT-IT.

In particular, in the case where filtering of a content to be distributed is carried out in a unit of a channel or broadcasting station, "PDI descriptor" into which the PDI-A, PDI-A query or PDI-Q is to be placed is prescribed newly in the descriptor loop ("Service #1" in FIG. 29) of the service level of SMT.

On the other hand, in the case where filtering of a content to be distributed is carried out in a unit of a content, "PDI descriptor" into which the PDI-A, PDI-A query or PDI-Q is to be placed is prescribed newly in the descriptor loop ("Content #1" in FIG. 29) of the service level of NRT-IT.

FIG. 30 illustrates an example of the syntax of "PDI descriptor." In FIG. 30, each of descriptors to be described is defined together with a bit number (No. of Bits) and a format (Format).

According to the syntax illustrated in FIG. 30, a PDI-A, a PDI-A query or a PDI-Q is described in a descriptor of variable bits, that is, in "PDI_Q or PDI_A or PDI_A_Query."

It is to be noted that the syntax of "PDI descriptor" is not limited to the example illustrated in FIG. 30.

In this manner, the present invention can be applied also to a broadcasting system which carries out NRT broadcasting.

It is to be noted that naturally the present invention may be applied also to a broadcasting system which broadcasts in accordance with the ATSC-M/H method described hereinabove and a broadcasting system which carries out NRT broadcasting in accordance with a method other than an existing broadcasting system.

While the series of processes described above can be executed by hardware, it may otherwise be executed by software. In the case where the series of processes is executed by software, a program which constructs the software is installed from a program recording medium into a computer incorporated in hardware for exclusive use or, for example, a personal computer for universal use which can execute various functions by installing various programs.

The program recording medium in which a program which is installed in a computer and can be placed into a state in which it can be executed by the computer is stored is configured from, as seen in FIG. 2, a removable medium 31 which is a package medium formed from a magnetic disk (including a flexible disk), an optical disk (including a CD-ROM (Compact Disc-Read Only Memory), a DVD (Digital Versatile Disc) and an optical magnetic disc) or a semiconductor memory, the ROM 22 in which the program is stored temporarily or permanently or a hard disk or the like which configures the storage section 28. Storage of the program into the program recording medium is carried out through a wire or wireless communication medium such as a local area network, the Internet or a digital satellite broadcast through the communication section 29 which is an interface of a router, a modem or the like as occasion demands.

It is to be noted that, in the present specification, the steps which describe the program may be but need not necessarily be processed in a time series in the order as described, and include processes which are executed in parallel or individually without being processed in a time series.

Further, in the present specification, the term "system" is used to represent an entire apparatus composed of a plurality of apparatus.

While preferred embodiments of the present invention have been described using specific terms, such description is for illustrative purpose only, and it is to be understood that changes and variations may be made without departing from the spirit or scope of the following claims.

What is claimed is:

1. A method of a content reception apparatus for receiving non-real-time (NRT) content, the method comprising:
    receiving a digital television broadcast signal including a digital television program, the NRT content, and filtering criteria related to the NRT content;
    outputting the digital television program for display to a user;
    receiving question information relating to a preference, demographic, or interest of the user,
    generating user answer information based on the question information received;
    comparing the user answer information and the filtering criteria; and
    filtering the NRT content based on the comparison.

2. The method according to claim 1, wherein the question information is extracted from a plurality of digital television broadcast signals provided by a plurality of service providers.

3. The method according to claim 1, wherein the question information is unique to a service provider providing the digital television broadcast signal.

4. The method according to claim 1, comprising:
    outputting for display to the user one or more questions based on the question information;

receiving a signal indicative of a response by the user to the one or more questions displayed; and generating the user answer information in accordance with the signal received.

5. A non-transitory computer-readable storage medium storing instructions which, when executed by a computer, cause the computer to perform a method of a content reception apparatus for receiving non-real-time (NRT) content, the method comprising:

receiving a digital television broadcast signal including a digital television program, the NRT content, and filtering criteria related to the NRT content;

outputting the digital television program for display to a user;

receiving question information relating to a preference, demographic, or interest of the user, generating user answer information based on the question information received;

comparing the user answer information and the filtering criteria; and filtering the NRT content based on the comparison.

6. The non-transitory computer-readable storage medium according to claim 5, wherein the question information is extracted from a plurality of digital television broadcast signals provided by a plurality of service providers.

7. The non-transitory computer-readable storage medium according to claim 5, wherein the question information is unique to a service provider providing the digital television broadcast signal.

8. The non-transitory computer-readable storage medium according to claim 5, wherein the method comprises:

outputting for display to the user one or more questions based on the question information;

receiving a signal indicative of a response by the user to the one or more questions displayed; and generating the user answer information in accordance with the signal received.

9. A content reception apparatus for receiving non-real-time (NRT) content, comprising:

circuitry configured to:

receive a digital television broadcast signal including a digital television program, the NRT content, and filtering criteria related to the NRT content;

output the digital television program for display to a user;

receive question information relating to a preference, demographic, or interest of the user, generate user answer information based on the question information received;

compare the user answer information and the filtering criteria; and filter the NRT content based on the comparison.

10. The content reception apparatus according to claim 9, wherein the circuitry is configured to extract the question information from a plurality of digital television broadcast signals provided by a plurality of service providers.

11. The content reception apparatus according to claim 9, wherein the question information is unique to a service provider providing the digital television broadcast signal.

12. The content reception apparatus according to claim 9, wherein the circuitry is configured to:

output for display to the user one or more questions based on the question information;

receive a signal indicative of a response by the user to the one or more questions displayed; and generate the user answer information in accordance with the signal received.

* * * * *